(12) United States Patent
Jeong et al.

(10) Patent No.: US 11,060,961 B2
(45) Date of Patent: Jul. 13, 2021

(54) APPARATUS AND METHOD FOR EVALUATING ELECTRODE EMBRITTLEMENT

(71) Applicant: LG Chem, Ltd., Seoul (KR)

(72) Inventors: An-Soo Jeong, Daejeon (KR); Nam-Won Kim, Daejeon (KR); Young-Tae Kim, Daejeon (KR); Pil-Kyu Park, Daejeon (KR); Han-Gab Song, Daejeon (KR); Min-Gyu Kim, Daejeon (KR)

(73) Assignee: LG Chem, Ltd.

( * ) Notice: Subject to any disclaimer, the term of this patent is extended or adjusted under 35 U.S.C. 154(b) by 203 days.

(21) Appl. No.: 16/473,994

(22) PCT Filed: Sep. 7, 2018

(86) PCT No.: PCT/KR2018/010519
§ 371 (c)(1),
(2) Date: Jun. 26, 2019

(87) PCT Pub. No.: WO2019/050344
PCT Pub. Date: Mar. 14, 2019

(65) Prior Publication Data
US 2020/0225134 A1 Jul. 16, 2020

(30) Foreign Application Priority Data

Sep. 7, 2017 (KR) .................. 10-2017-0114600
Sep. 4, 2018 (KR) .................. 10-2018-0105616

(51) Int. Cl.
*G01N 3/28* (2006.01)
*G01N 3/02* (2006.01)
(Continued)

(52) U.S. Cl.
CPC .............. *G01N 3/28* (2013.01); *G01N 3/02* (2013.01); *G01N 3/20* (2013.01); *G01N 3/04* (2013.01);
(Continued)

(58) Field of Classification Search
CPC .. G01N 3/02; G01N 3/04; G01N 3/08; G01N 3/20; G01N 3/28; G01N 2203/0003;
(Continued)

(56) References Cited

U.S. PATENT DOCUMENTS 4,864,867 A * 9/1989 Manahan, Sr. .......... G01N 3/00
73/851
5,165,287 A * 11/1992 Manahan, Sr. .......... G01N 3/20
73/826
(Continued)

FOREIGN PATENT DOCUMENTS

| CN | 1274840 A | 11/2000 |
| CN | 101542264 A | 9/2009 |

(Continued)

OTHER PUBLICATIONS

International Search Report from Application No. PCT/KR2018/010519, dated Dec. 21, 2018.
(Continued)

*Primary Examiner* — Jonathan M Dunlap
(74) *Attorney, Agent, or Firm* — Lerner, David, Littenberg, Krumholz & Mentlik, LLP

(57) ABSTRACT

Apparatus and methods of evaluating brittleness by measuring force applied to an electrode specimen by simulating a wound state of a jelly-roll type electrode assembly are disclosed herein. In an embodiment, a brittleness evaluation apparatus includes a jig unit, a driving unit, and a measurement analyzing unit. The jig unit includes two jigs, a groove formed between the jigs, a pressing plate, and guides. The
(Continued)

jigs facing each other and have top surfaces formed in a horizontal plane and configured to receive a specimen arranged on the top surfaces along a length direction extending between and along the top surfaces. The pressing plate is arranged perpendicular to the length direction and configured to cause the specimen to bend by descending into the groove. The guides are located on each of the top surfaces of the jigs and configured to prevent distortion of the specimen during descent of the pressing plate.

14 Claims, 14 Drawing Sheets

(51) Int. Cl.
  *G01N 3/20* (2006.01)
  *G01N 3/04* (2006.01)
  *G01N 3/08* (2006.01)

(52) U.S. Cl.
  CPC ....... *G01N 3/08* (2013.01); *G01N 2203/0003* (2013.01); *G01N 2203/003* (2013.01); *G01N 2203/0023* (2013.01); *G01N 2203/0039* (2013.01); *G01N 2203/0067* (2013.01); *G01N 2203/0069* (2013.01); *G01N 2203/0075* (2013.01); *G01N 2203/0087* (2013.01); *G01N 2203/0252* (2013.01); *G01N 2203/0264* (2013.01); *G01N 2203/0278* (2013.01); *G01N 2203/0282* (2013.01); *G01N 2203/04* (2013.01)

(58) Field of Classification Search
  CPC ......... G01N 2203/003; G01N 2203/04; G01N 2203/0023; G01N 2203/0039; G01N 2203/0067; G01N 2203/0069; G01N 2203/0075; G01N 2203/0087; G01N 2203/0252; G01N 2203/0264; G01N 2203/0278; G01N 2203/0282
  See application file for complete search history.

(56) References Cited

U.S. PATENT DOCUMENTS

| | | |
|---|---|---|
| 5,616,848 A | 4/1997 | Hemingway et al. |
| 7,461,564 B2 | 12/2008 | Glaesemann |
| 2004/0045357 A1 | 3/2004 | Goto |
| 2011/0239774 A1* | 10/2011 | Schuyler ................. G01N 3/32 73/812 |
| 2017/0074762 A1 | 3/2017 | Lotze et al. |
| 2017/0183250 A1 | 6/2017 | Soyama |
| 2017/0191916 A1 | 7/2017 | Aegerter et al. |
| 2017/0363523 A1 | 12/2017 | Kim et al. |

FOREIGN PATENT DOCUMENTS

| | | | |
|---|---|---|---|
| CN | 104316390 A | 1/2015 | |
| CN | 104390857 A | 3/2015 | |
| CN | 106458690 A | 2/2017 | |
| CN | 106525599 A | 3/2017 | |
| DE | 2844867 A1 * | 4/1980 | ......... B23Q 3/15573 |
| JP | S58180455 U | 12/1983 | |
| JP | S60042638 A | 3/1985 | |
| JP | 200097831 A | 4/2000 | |
| JP | 2001004514 A | 1/2001 | |
| JP | 2004101407 A | 4/2004 | |
| JP | 2016080464 A | 5/2016 | |
| KR | 20000065322 A | 11/2000 | |
| KR | 20110102986 A | 9/2011 | |
| KR | 20120116267 A | 10/2012 | |
| KR | 20140041289 A | 4/2014 | |
| KR | 20140131814 A | 11/2014 | |
| KR | 200477056 Y1 | 5/2015 | |
| KR | 20160100566 A | 8/2016 | |
| KR | 20170025533 A | 3/2017 | |
| KR | 101737817 B1 | 5/2017 | |
| KR | 20170086112 A | 7/2017 | |
| WO | WO-2015090467 A1 * | 6/2015 | ............... G01N 3/56 |
| WO | WO-2017055367 A1 * | 4/2017 | ............... G01N 3/20 |

OTHER PUBLICATIONS

Extended European Search Report including Written Opinion for EP18854906.7 dated Nov. 27, 2019.
Search Report from Chinese Office Action for Application No. 201880004660.3 dated Mar. 25, 2021; 4 pages.

\* cited by examiner

BRITTLE-DUCTILE GRAPH

APPARATUS AND METHOD FOR EVALUATING ELECTRODE EMBRITTLEMENT

CROSS-REFERENCE TO RELATED APPLICATIONS

The present application is a national phase entry under 35 U.S.C. § 371 of International Application No. PCT/KR2018/010519, filed on Sep. 7, 2018, which claims priority from Korean Patent Application No. 10-2017-0114600, filed on Sep. 7, 2017, and Korean Patent Application No. 10-2018-0105616, filed on Sep. 4, 2018, the disclosures of which are incorporated herein by reference.

TECHNICAL FIELD

The present disclosure relates to an electrode property evaluation apparatus and method, and more particularly, to an electrode brittleness evaluation apparatus and method.

BACKGROUND ART

Conventionally, a sheet-type electrode is used in secondary batteries, such as a lithium ion secondary battery. Thereamong, in a secondary battery including a jelly-roll type electrode assembly, for example, an electrode assembly wound while a separator is disposed between a sheet-type positive electrode and a sheet-type negative electrode is accommodated in a battery case, and an electrolyte solution is injected.

A positive electrode is formed by coating and compressing a layer of a positive electrode active material containing a lithium cobalt composite oxide, a lithium manganese composite oxide, or the like, on a surface of a positive electrode current collector sheet including a metal foil, such as an aluminum foil, a stainless steel foil, or the like. A negative electrode is formed by coating and compressing a layer of a negative electrode active material containing graphite, coke, or the like, on a surface of a negative electrode current collector sheet including a metal foil, such as a copper foil, a stainless steel foil, or the like.

Referring to processes of manufacturing a sheet-type electrode, first, an active material layer is formed as an active material slurry is coated and dried on a surface of an elongated current collector sheet. At this time, an uncoated portion where an active material paste is not coated is formed at both edges of the current collector sheet. Then, the current collector sheet on which the active material is formed passes through a pressure roll, and an active material is rolled on the surface of the current collector sheet. An elongated sheet-type electrode formed as such is cut to have a certain shape and is deployed as a sheet-type positive electrode or a sheet-type negative electrode in processes of manufacturing an electrode assembly. Next, after a separator is disposed between the sheet-type positive electrode and the sheet-type negative electrode, the result product is wound at a constant speed on a winding core rotating by a winder to prepare a jelly-roll type electrode assembly.

However, since the jelly-roll type electrode assembly obtained as such has a small winding radius particularly around the winding core, it is likely that a crack may be generated in the positive electrode or the negative electrode. Here, a crack includes a crack of an active material layer, a crack of a current collector sheet, and also consequent disconnection (including partial disconnection) of an electrode. Thereamong, the disconnection is fatal to battery performance, and thus should be significantly managed. Thus, it is necessary to determine the winding radius, particularly, a winding core radius, such that a crack is not generated while battery volume is unnecessarily increased, and it is not necessary to determine winding tension accordingly.

Although it is important to determine accurate winding radius and winding tension, there is no method to determine whether the winding radius and the winding tension are proper from the electrode assembly after the winding. This is because, when the wound electrode assembly is disassembled, a crack is generated during the disassembling and is difficult to be distinguished from a crack generated during the winding.

The generation of a crack of an electrode is also affected by a property, such as ductility or brittleness of the electrode. Thus, it is necessary to evaluate the ductility or brittleness of the electrode before winding the electrode assembly. However, conventionally, there is no appropriate evaluating apparatus or method.

An electrode that is an evaluation target in the present disclosure includes a current collector and an active material layer. An existing coating film field suggests a method of using an apparatus, such as a pencil hardness tester, a nano-indenter, or a dynamic mechanical analysis (DMA) as a method of evaluating a state of a coating film, and thus application of such an apparatus and method to electrode evaluation may be considered.

However, an error is severe even when the pencil hardness tester tests the same coating film because a pencil angle and a pencil surface setting are determined by a measurer. The nano-indenter that measures hardness or an elastic modulus by pressurizing a coating film by using a nano-tip has a large error because opposite results are obtained when the nano-tip is located at a recessed portion of a surface of the coating film and when the nano-tip is located at a protruding portion of the surface. In the DMA that measures the elastic modulus by moving the coating film up and down while holding two ends of the coating film, it is difficult for the elastic modulus to represent a property of an overall structure including the coating film and an underlying film, a difference in result values is high depending on a thickness, a measurement time is long, specification is difficult since an error is severe even in the same specimen, and the DMA is difficult to be applied in actual processes due to high prices of the DMA itself.

Above all, even when the active material is evaluated by using the conventional pencil hardness tester, nano-indenter, DMA, or the like, it is difficult to obtain a result representing an electrode property as a whole including not only the active material layer, but also the current collector.

Meanwhile, a bending test is performed to determine ductility or strength of a specimen by measuring fracture strength when a load is applied to the specimen, and has been performed by applying a load until a specified angle or fracture is generated in an inner radius of the specimen and determining whether another defect, such as a crack or the like, is generated outside a curved portion. Such a bending test method includes a three-point bending or four-point bending test method.

The three-point bending test is a method of supporting the specimen at two points and applying a load to a center point to bend the specimen. Such a method is applied to a material having small strain or a material in which a stress-strain relationship until fracture follows the Hooke's law.

The four-point bending test is a method of supporting the specimen at two points and applying a load to each of points corresponding to ⅓ of a distance from the two points. Such a method is used when the specimen is not fractured even by the three-point bending method.

However, since most bending tests measure fracture strength of the specimen, even when the bending test is applied to evaluate an electrode property, it is not suitable to determine the electrode property, for example, whether brittleness is superior or ductility is superior until the electrode is fractured.

DISCLOSURE

Technical Problem

The present disclosure provides an apparatus and method of evaluating a property, in particular, brittleness, of an electrode, in particular, an active material layer of the electrode.

Particularly, the present inventors provide an apparatus and method of evaluating brittleness by measuring force applied to a specimen while simulating a situation similar to a wound state on the specimen, with respect to evaluating brittleness.

Also, a brittleness evaluating apparatus in which a factor affecting measurement accuracy of measuring force applied to a specimen is removed is to be provided.

Moreover, a brittleness evaluating method for qualitatively and quantitatively accurately evaluating brittleness of an electrode by using such an apparatus is to be provided.

Technical Solution

In one aspect of the present disclosure, there is provided a brittleness evaluation apparatus including: a jig unit, a driving unit, and a measurement analyzing unit. The jig unit includes two jigs, a pressing plate, and guides. The two jigs face each other and have top surfaces formed in a horizontal plane and are configured to receive a specimen arranged along a length direction extending between and along the top surfaces. A groove is formed between the two jigs, where the groove having a width gradually decreasing downward from the top surfaces. The pressing plate is provided perpendicular to the length direction and configured to cause the specimen, when present on the top surfaces of the two jigs, to bend by descending into the groove while pressing the specimen. The guides are located on each of the top surfaces of the jigs and configured to prevent distortion of the specimen during the descent of the pressing plate into the groove. The driving unit is configured to cause the pressing plate to descend into the groove. The measurement analyzing unit is configured to measure force applied to the specimen during the descent of the pressing plate into the groove, and to evaluate brittleness.

According to the brittleness evaluation apparatus according to the present disclosure, the two jigs may be configured to support each end portion of the specimen, and a cross section of surfaces of the jigs facing each other may include a ¼ oval arc.

According to the brittleness evaluation apparatus according to the present disclosure, the brittleness evaluation apparatus may further include horizontal bars, wherein a horizontal bar is provided at each of the two jigs such that the jigs are movable towards each other and away from each other.

According to the brittleness evaluation apparatus according to the present disclosure, the guides may be configured to restrict lateral movement and vertical movement of a portion of the specimen placed on the top surfaces of the jigs.

Here, each guide may include an upper wall portion configured to restrict vertical movement of the specimen, two side wall portions extending between a top surface of a jig and a bottom surface of the upper wall portion, wherein the two side wall portions are configured to restrict lateral movement of the specimen. Each guide includes a penetrating portion that is a space defined by the two side wall portions, the bottom surface of the upper wall portion, and the top surface of the jig, where the penetrating portion is configured to allow movement of the specimen in the length direction. The guides may be located on each of the top surfaces of the jigs such that the penetrating portions of each guide face each other, and the specimen may be disposed on the top surfaces of the two jigs by extending through each of the penetrating portions of the guides.

According to the brittleness evaluation apparatus according to the present disclosure, the guide may be manufactured from aluminum or steel use stainless (SUS).

According to the brittleness evaluation apparatus according to the present disclosure, the guides may be attached or fixed to the top surfaces of the two jigs in a region excluding where the specimen, when present, is arranged, and wherein each guide includes a portion spaced apart from the top surfaces of the jigs, and an attached or fixed portion in a region excluding where the specimen, when present, is arranged.

According to the brittleness evaluation apparatus according to the present disclosure, a thickness of the pressing plate may be the same as a width of a narrowest portion of the groove.

According to the brittleness evaluation apparatus according to the present disclosure, the pressing plate may have a rectangular parallelepiped shape having a length, a wide, and a thickness, where the length is greater than the width is greater than the thickness. The pressing plate has a tip portion having a semi-sphere or semi-polyprism shape, where the tip portion is formed on a side of the rectangular parallelpiped shape defined by the thickness and the width.

Here, the specimen may be an electrode for a jelly-roll type electrode assembly, and a radius or size of a cross section of the tip portion may have a same dimension as a winding core for manufacturing a jelly-roll type electrode assembly.

In another aspect of the present disclosure, there is also provided a brittleness evaluation method including: after arranging a specimen on the brittleness evaluation apparatus, descending the pressing plate and measuring force applied to the specimen while the pressing plate descends; graphing a value of the measured force as a function of specimen displacement; and evaluating a brittleness/ductility level from a shape of the graph of measured force as a function of specimen displacement, or obtaining, from the graph, a brittleness value that is a difference of the value of the force before and after plastic deformation of the specimen.

The evaluating of the brittleness/ductility level comprises determining an aspect among brittle, brittle/ductile, ductile/brittle, and ductile.

According to the brittleness evaluation method according to the present disclosure, the pressing plate may descend vertically at a speed of 0.5 to 2 mm/sec.

According to the brittleness evaluation method according to the present disclosure, the specimen may be stored in relative humidity of 0 to 10% and at a room temperature of 25° C. before being measured.

According to the brittleness evaluation method according to the present disclosure, obtaining the brittleness value comprises obtaining, from the graph, a difference between a highest value of the force applied to the specimen and a value of the force applied after plastic deformation has occurred.

Advantageous Effects

According to a brittleness measurement apparatus and method of the present disclosure, electrode brittleness may be accurately, conveniently, and easily evaluated by bending an electrode before actual winding is applied to the electrode to simulate a situation similar to a winding process.

A brittleness evaluation apparatus of the present disclosure includes a guide preventing distortion of a specimen on a jig, and thus a measurement error may be reduced as much as possible with respect to measuring force applied to the specimen (or force received by the specimen), and accordingly, measurement accuracy is improved. Thus, accurate measurement is possible and thus accurate evaluation is possible.

When a graph (displacement-force graph) in which an X-axis is a specimen displacement and a Y-axis is a value of force applied to a specimen is displayed by using the brittleness evaluation apparatus of the present disclosure, an aspect of a crack generated in an active material layer of an electrode may be qualitatively evaluated from a shape of the graph.

The present inventors discovered that aspects an active material layer of an electrode being fractured or aspects of cracks generated in the active material layer of the electrode vary based on factors such as a component of the active material layer (or active material slurry) of the electrode, a composition ratio (amount) of the active material layer, and/or an electrode rolling degree (however, not limited thereto), and that the aspects can be distinguished from each other from a displacement-force graph obtained by using the brittleness evaluation apparatus of the present disclosure.

For example, it was discovered that, when force, such as winding, is applied to electrodes, active material layers of some electrodes suddenly fractured without an elongation process whereas active material layers of other electrodes fractured while being elongated, active material layers of other electrodes partially fractured and then elongated, and active material layers of other electrodes fractured without elongation, and that shapes of displacement-force graphs of such cases were different. In this regard, these cases were classified into total four types of brittleness/ductility levels of brittle, brittle/ductile, ductile/brittle, and ductile.

Accordingly, it may be qualitatively and intuitively determined to which one of the four types of brittleness/ductility levels an electrode corresponds by obtaining the displacement-force graph from the brittleness evaluation apparatus of the present disclosure.

Also, when a difference of values of force before and after plastic deformation of a specimen is obtained from the displacement-force graph, such a value may be digitized as a new parameter by being referred to as a "brittleness value", and accordingly, it is suggested that brittleness may also be evaluated quantitatively.

As such, according to the present disclosure, quantitative and qualitative evaluation of an electrode property, in particular, brittleness, is enabled.

The brittleness evaluation apparatus of the present disclosure is useful in secondary battery manufacturing fields since the brittleness evaluation apparatus is accurate, has a short measurement time, has easy specification, and is executed at low costs compared to a conventional apparatus, such as a pencil hardness tester, nano-indenter, DMA, or the like, while enabling quantitative and qualitative measurement of electrode brittleness that is unable to be measured by the conventional apparatus.

Also, according to the present disclosure, since an aspect of a pressing plate pressing a specimen is similar to a situation where an electrode is wound around a winding core, a possibility of generation of a crack may be pre-determined by creating a situation similar to winding before the electrode is wound, and a consequent electrode property may be specified.

Although specification is performed by using a relatively simple principle, the specification is very preferable in terms of mass production of secondary batteries since application of following processes is very easy. For example, according to a brittleness evaluation method of the present disclosure, an electrode may be improved (for example, increasing ductility) by adjusting brittleness of the electrode or the like based on evaluated brittleness, and brittleness of the improved electrode may be evaluated again to determine actual improvement.

As such, when the brittleness evaluation method of the present disclosure is applied to processes, crack generation may be reduced and at the same time, unnecessary volume increase may not occur and manufacturing of an electrode in which lithium ions may be smoothly moved may be guided, and as a result, a jelly-roll type lithium secondary battery having excellent performance may be provided.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the present specification, an 'electrode' denotes a positive electrode or a negative electrode of a secondary battery, and according to an aspect of an electrode of the present disclosure, an active material layer may be formed on at least one surface of a current collector but is not limited thereto. For example, the active material layer may be formed on both surfaces of the current collector or a metal layer may function as the current collector and the active material layer without having to separately include the active material layer. However, a state of the active material layer largely varies based on a storage condition of an electrode, and thus an aspect of generation of a crack also varies. Accordingly, for accurate measurement, the electrode stored in a uniform state may be used for measurement. For example, the electrode may be measured within 1 day (24 hours) after active material slurry is coated and dried on the current collector and then rolled. Also, the electrode may be stored at relative humidity of 0 to 10% and at a room temperature (25° C.) before measurement.

In the present specification, a 'specimen' denotes a measurement target to be measured by using a brittleness evaluation apparatus of the present disclosure, and for example, may denote a specimen cut to have a certain width and a certain length from the electrode. The specimen having a rectangular band shape may be cut by making the length longer than the width.

Figure 1:
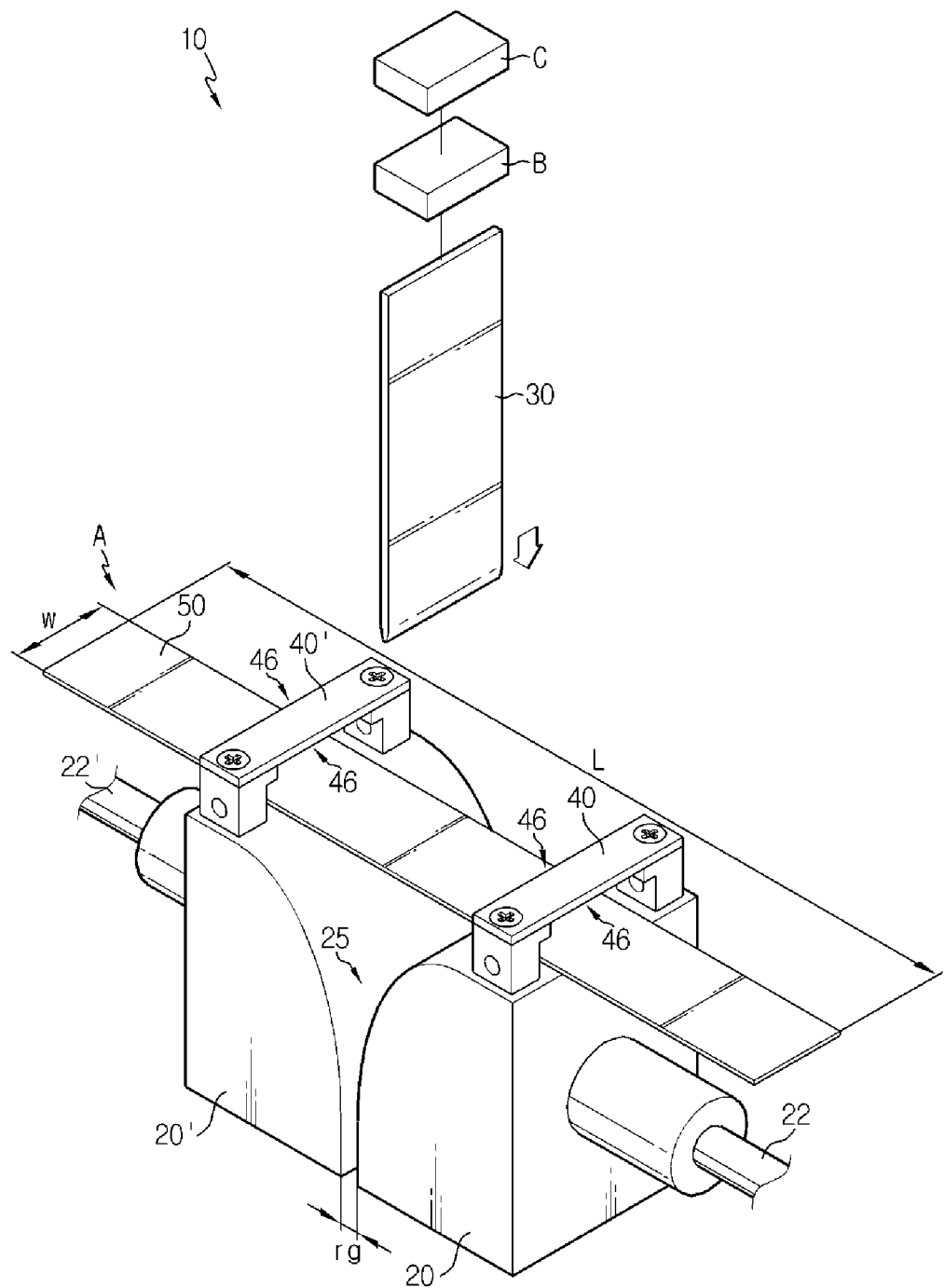
FIGS. 1 and 2 are diagrams schematically showing a brittleness evaluation apparatus according to an embodiment of the present disclosure.
Figure 2:
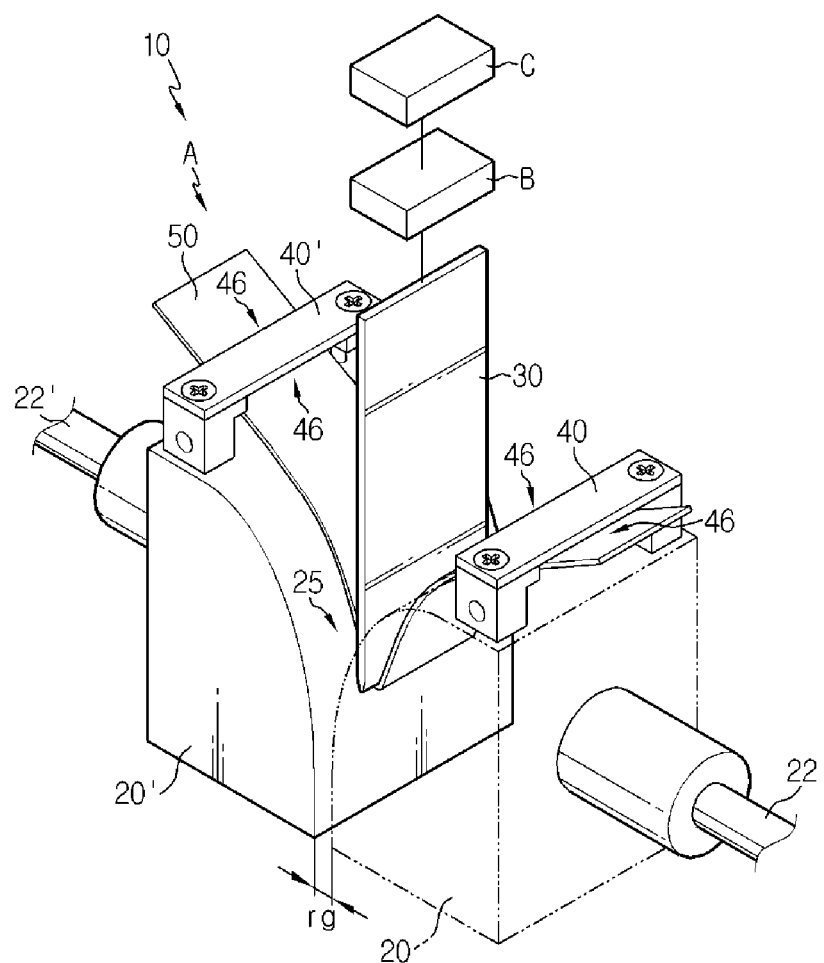

FIGS. 1 and 2 are diagrams schematically showing a brittleness evaluation apparatus according to an embodiment of the present disclosure.

Referring to FIG. 1, a brittleness evaluation apparatus 10 includes a jig unit A, a driving unit B, and a measurement analyzing unit C. FIG. 2 mainly illustrates the jig unit A thereamong.

Referring to FIGS. 1 and 2, the jig unit A includes two jigs 20 and 20', a pressing plate 30, and guides 40 and 40'.

First, the jigs 20 and 20' have top surfaces formed in horizontal planes, and a specimen 50 is provided along a length direction as shown in FIG. 1 on the top surfaces. The specimen 50 has a rectangular band shape having a length L longer than a width W. The jigs 20 and 20' are provided to face each other such that a groove 25 whose width rg along the length direction of the specimen 50 gradually decreases from the top surfaces downward is formed.

The jigs 20 and 20' may respectively support both end portions of the specimen 50 in the length direction and a cross section of surfaces of the jigs 20 and 20' facing each other may include a ¼ oval arc. However, the cross section does not necessarily have to be an oval arc, but may form a continuous curved surface such that the groove 25 whose width rg gradually decreases is formed.

Horizontal bars 22 and 22' may be respectively provided at the jigs 20 and 20'. The horizontal bars 20 and 22' enable the jigs 20 and 20' to move in an approaching direction or a receding direction.

When the surfaces of the jigs 20 and 20' facing each other are referred to as 'front' and opposite surfaces are referred to as back, the horizontal bars 22 and 22' may be provided at the back of the jigs 20 and 20'. The size of width rg of the groove 25 may be further adjusted by adjusting the horizontal bars 22 and 22' to move the jigs 20 and 20' in a horizontal direction such that the jigs 20 and 20' move farther or closer in two sides.

The pressing plate 30 is provided perpendicular to the length direction of the specimen 50, i.e., parallel to a width direction of the specimen 50, above the jigs 20 and 20' and causes the specimen 50 to bend by being inserted into the grove 25 while pressing the specimen 50. Such a pressing plate 30 may be provided such that bending similar to a situation in which the specimen 50 is wound around a winding core occurs.

The guides 40 and 40' are located respectively on the top surfaces of the jigs 20 and 20' and prevent distortion of the specimen 50 when the pressing plate 30 descends. A direction crossing the front and back of the jigs 20 and 20' is the length direction of the specimen 50. When movement of the specimen 50 in a direction perpendicular to the length direction of the specimen 50 on the horizontal plane, i.e., the width direction of the specimen 50, is referred to as lateral movement and movement of the specimen 50 in a direction perpendicular to the length direction of the specimen on a vertical plane, i.e., an ascending or descending direction of the pressing plate 30, is referred to as vertical movement, the distortion of the specimen 50 may occur due to the lateral movement or vertical movement of the specimen 50. The preferable guides 40 and 40' restrict the lateral movement and the vertical movement of a portion of the specimen 50 placed on the top surfaces of the jigs 20 and 20'.

The driving unit B descends the pressing plate 30. The measurement analyzing unit C is provided to measure force applied to the specimen while the pressing plate 30 descends, and evaluate brittleness based thereon. The driving unit B may enable the pressing plate 30 to descend at a constant speed, and enable the measurement analyzing unit C to measure the force applied to the specimen 50 by measuring the force required for the pressing plate 30 to descend at the constant speed. The force measured to perform a brittleness evaluation method of the present disclosure, a change of force based on transformation of the specimen 50, or the like may be determined by the measurement analyzing unit C that is connected to the pressing plate 30 and measures the force applied to the specimen 50 while the pressing plate 30 descends.

The driving unit B and the measurement analyzing unit C may be embodied by combining individual separate apparatuses or embodied in one apparatus. For example, the driving unit B and the measurement analyzing unit C may be embodied as a tension annealing (TA) apparatus or a universal material testing machine called a universal testing machine (UTM), as will be described later with reference to FIG. 6.

FIG. 2 illustrates a situation in which the pressing plate 30 descends and is inserted into the groove 25 while the specimen 50 is prepared as in FIG. 1. Preferably, when the pressing plate 30 descends and is inserted into the groove 25 while pressing the specimen 50 to cause the specimen 50 to bend as shown in FIG. 2, the guides 40 and 40' may restrict the lateral movement and the vertical movement of the portion of the specimen 50 placed on the top surfaces of the jigs 20 and 20'.

Since structures of the guides 40 and 40' are the same, the guide 40 will be described in detail with reference to FIG. 3.

Figure 3A:
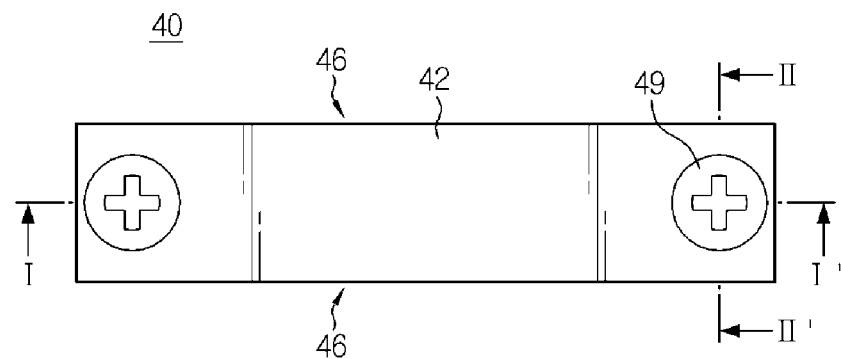
FIG. 3A shows a plan view of a guide preferable in a brittleness evaluation apparatus, according to an embodiment of the present disclosure.
Figure 3B:
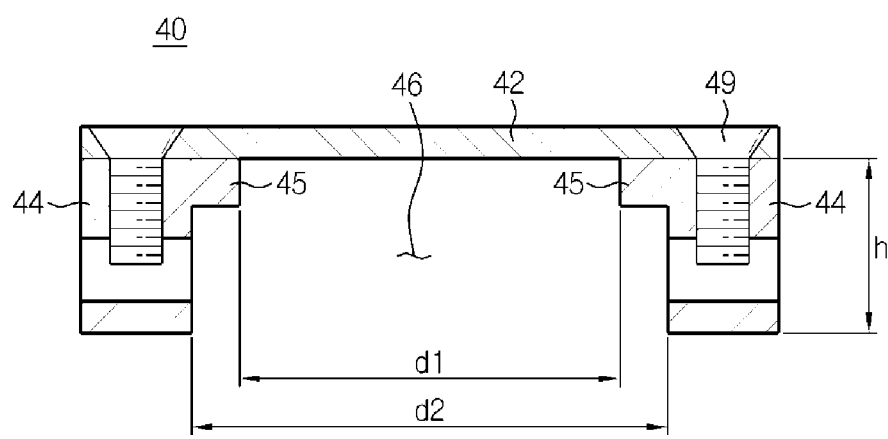
FIG. 3B shows a cross-sectional view of the guide in FIG. 3A taken along a line I-I' of FIG. 3A.
Figure 3C:
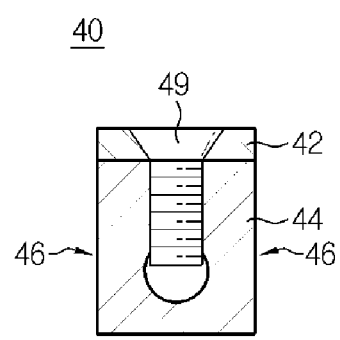
FIG. 3C shows a cross-sectional view taken along a line II-II' of FIG. 3A.

FIGS. 3A-3C shows diagrams of the guide 40 preferable in the brittleness evaluation apparatus 10, wherein FIG. 3A is a plan view of the guide 40, FIG. 3B is a cross-sectional view taken along a line I-I' of FIG. 3A, and FIG. 3C is a cross-sectional view taken along a line II-II' of FIG. 3A.

Referring to FIGS. 3A-3C, the guide 40 includes an upper wall portion 42 for restricting the vertical movement of the specimen 50, both side wall portions 44 standing upright on a bottom surface of the upper wall portion 42, placed on the top surface of the jig 20, and restricting the lateral movement of the specimen 50, and a penetrating portion 46 that is a space between the both side wall portions 44 and allowing movement of the specimen 50 in the length direction.

The upper wall portion 42 may be a rectangular plate material having long sides and short sides, wherein the long sides may be placed along the width direction of the specimen 50. Although the present disclosure is not limited thereto, the long sides of the upper wall portion 42 may be 44 mm and the short sides may be 10 mm. A thickness of the upper wall portion 42 may be 2 mm.

The both side wall portions 44 may be formed on the bottom surface of the upper wall portion 42 at the short sides. Then, the penetrating portion 46 is formed in the length direction of the specimen 50.

Such guides 40 and 40' are respectively located on the top surfaces of the jigs 20 and 20' as shown in FIGS. 1 and 2 such that the penetrating portions 46 face each other, and the specimen 50 is arranged on the top surfaces of the jigs 20 and 20' by penetrating the penetrating portion 46 as shown in FIGS. 1 and 2.

Meanwhile, the guides 40 and 40' may be attached or fixed to the top surfaces of the jigs 20 and 20'. A method used herein is not specifically limited, and for example, a taping, adhesive, screw, welding, or soldering method may be applied.

In the guide 40, the upper wall portion 42 and the both side wall portions 44 may be integrally formed or may be assembled. For example, a combining structure using a screw 49 as shown in FIG. 3 may be used to assemble the both side wall portions 44 to the upper wall portion 42.

In the guide 40, an interval between the both side wall portions 44 is a specimen width direction size of the penetrating portion 46. Such a size indicates a space for the specimen 50 to move laterally inside the guides 40 and 40', i.e., an inner width of the guides 40 and 40' in the specimen width direction.

The interval between the both side wall portions 44 in the guide 40 may be uniform along a direction of height h of the both side wall portions 44 or the interval at the upper wall portion 42 may be narrower. The simplest shape is that the interval between the both side wall portions 44 in the guides 40 and 40' is uniform along the direction of the height h of the both side wall portions 44. In FIG. 3, the interval at the upper wall portion 42 is narrower by providing a supporting end 45 in which the width of the both side wall portions 44 close to the upper wall portion 42 is thicker. For example, the interval between the both side wall portions 44 has a stepped configuration having two intervals, i.e., a minimum interval d1 that is a narrow interval corresponding to an interval between the supporting ends 45 at the upper wall portion 42 and a maximum interval d2 that is a wide interval corresponding to an interval between the both side wall portions 44 therebelow.

In the illustrated example, the minimum interval d1 between the both side wall portions 44 is equal to or slightly greater than the width of the specimen 50. In order to completely restrict the lateral movement of the specimen 50, the minimum interval d1 and the width should be the same, but the minimum interval d1 is slightly greater in terms of a space for slight movement considering friction by the guide 40.

When the friction by the guide 40 is to be minimized by allowing slight lateral movement of the specimen 50, a lateral margin allowing the lateral movement is provided. At this time, the maximum interval d2 between the both side wall portions 44 may be determined by further adding such lateral margin to the minimum interval d1. In this case, the lateral movement of the specimen 50 is allowed by the lateral margin near a point where the pressing plate 30 starts to contact the specimen 50 as shown in FIG. 2, but the lateral movement is further tightly restricted as the specimen 50 is located in the minimum interval d1 even when both end portions of the specimen 50 in the length direction is lifted to contact the upper wall portion 42 by force of the pressing plate 30 pressing the specimen 50, and thus accurate force measurement is enabled. Although the present disclosure is not limited thereto, for example, when the width W of the specimen 50 is about 20 mm, the minimum interval d1 may be 24 mm and the maximum interval d2 may be 30 mm.

Meanwhile, it is to be noted that the upper wall portion 42 is separated from the top surface of the jig 20 by the height h of the side wall portion 44. In other words, a portion of the guide 40 excluding the attached or fixed portion is spaced apart from the top surface of the jig 20. The height h of the side wall portion 44 is equal to or greater than the thickness of the specimen 50. In the illustrated embodiment particularly, the thickness of the supporting end 45 is equal to or greater than the thickness of the specimen 50. The height h of the side wall portion 44 provides a margin of the vertical movement of the specimen 50 in the guide 40. The height h of the side wall portion 44 is determined considering such a margin. Since the both end portions of the specimen 50 in the length direction are no longer lifted due to the upper wall portion 42 even when the both end portions are lifted by the force of the pressing plate 30 pressing the specimen 50, stable force measurement is enabled while the vertical movement of the specimen 50 is restricted.

The upper wall portion 42 of the guide 40 may be spaced apart from the top surface of the jig 20 by a height in a range of 1 to 15 mm. Although the present disclosure is not limited thereto, for example, the height h of the side wall portion 44 may be 11 mm. Here, the thickness of the supporting end 45 may be 3 mm. Then, a height of a portion having more lateral margin is 8 mm.

The guides 40 and 40' should not affect the force applied to the specimen 50 according to descending of the pressing plate 30. In this regard, a friction coefficient may be 0, and even when it is not easy to manufacture the guides 40 and 40' having the friction coefficient of 0, the guides 40 and 40' may be manufactured to have the friction coefficient close to 0. Also, it is to be considered that a value of force measured may vary according to the friction coefficient of the guides 40 and 40'.

For example, when the guides 40 and 40' are formed of a material having a relatively high friction coefficient, a height spaced apart from the top surfaces of the jigs 20 and 20' may be designed to be high such that the specimen 50 is guided not to contact the jigs 20 and 20', and when the guides 40 and 40' are formed of a material having a relatively low friction coefficient, the height spaced apart from the top surfaces of the jigs 20 and 20' may be designed to be lower. Preferably, the guides 40 and 40' may be manufactured from aluminum or SUS. SUS is the JIS expression and denotes "steel use stainless". A KS symbol is STS (stainless steel), and SUS and STS are the same.

Figure 4:
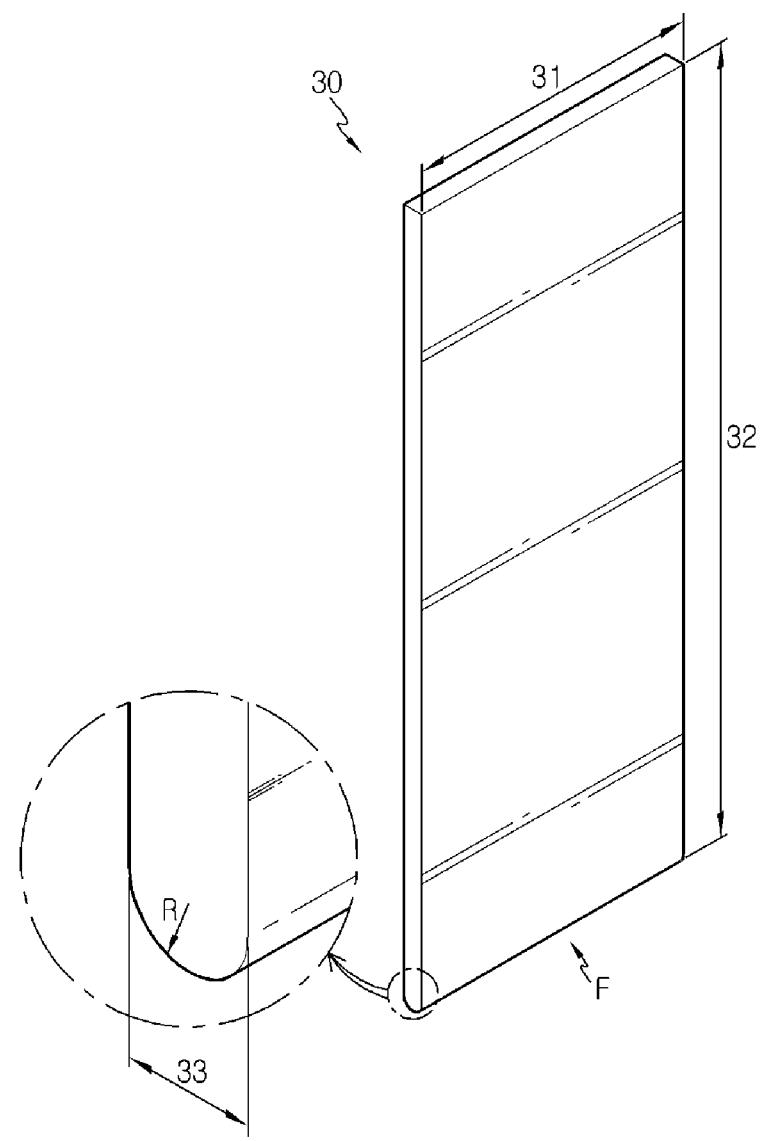
FIG. 4 is a perspective view of a pressing plate preferable in a brittleness evaluation apparatus, according to an embodiment of the present disclosure.

FIG. 4 is a perspective view of the pressing plate 30 preferable in the brittleness evaluation apparatus 10.

As shown in FIG. 4, the pressing plate 30 may have a plate shape having a uniform thickness. The pressing plate 30 may have a flat rectangular parallelepiped shape and may be arranged such that a narrow long side form a base. The base denotes a portion that directly causes the specimen 50 to bend. For example, the pressing plate 30 may have a plate shape in which a thickness 33 is smaller than a width 31 and a length 32.

As shown in FIGS. 1 and 2, the pressing plate 30 may be provided perpendicular to the length direction of the specimen 50 above the jigs 20 and 20', i.e., parallel to the width direction of the specimen 50, and causes the specimen 50 to bend by being inserted into the groove 25 while descending and pressing the specimen 50. In this regard, the width 31 of the pressing plate 30 may be prepared to be equal to or greater than the width of the specimen 50. Accordingly, the pressing plate 30 may support the entire width of the specimen 50 while causing the specimen 50 to uniformly bend along the width and receive force.

Also, since the specimen 50 needs to be sufficiently inserted into the groove 25 between the jigs 20 and 20' by the pressing plate 30, the length 32 of the pressing plate 30 may be equal to or greater than the depth of the groove 25 formed between the jigs 20 and 20'.

It is preferable to prepare the thickness 33 of the pressing plate 30 to be the same as the width of a narrowest portion of the groove 25 between the jigs 20 and 20', i.e., to be tight when the pressing plate 30 is inserted into the narrowest portion of the groove 25 between the jigs 20 and 20'. In this case, a distance between the pressing plate 30 and the groove 25 is converged to 0 immediately before plastic deformation occurs as the pressing plate 30 presses the specimen 50 and inserted into the groove 25. The thickness 33 of the pressing plate 30 may be in a range of 0.96 to 2.96 mm.

Although the present disclosure is not limited thereto, for example, the width 31 of the pressing plate 30 may be 50 mm, the length 32 may be 50 mm, and the thickness 33 may be 1 mm.

The pressing plate 30 may be arranged such that the narrow long side faces downward, while a tip portion F of the narrow long side of the pressing plate 30, i.e., the base causing the specimen 50 to bend may have a semi-sphere or semi-polyprism shape. Accordingly, the tip portion F in a cross section in a direction of the length 32 of the pressing plate 30 may be semi-circle or a semi-polygon. When the tip portion F is formed in a plane, the base of the pressing plate 30 contacting the side surfaces of the pressing plate 30 is formed in a shape like a corner of a rectangle, and at this time, unnecessary force is applied to the specimen 50 due to the corner of the rectangle, and thus accurate measurement is difficult to be performed. Accordingly, the tip portion F of the base of the pressing plate 30 is most preferable to be a semi-sphere shape that does not have an angled portion and realizes a shape most close to a winding core and may be formed in a semi-polyprism shape obtained by chamfering a semi-sphere shape at several angles as long as measurement accuracy is not adversely affected.

It is preferable that, when the cross section of the tip portion F of the base of the pressing plate 30 is a semi-circle or semi-polygon, a radius or size thereof (the longest length from the center of the semi-circle or semi-polygon to the outer circumference of the semi-circle or semi-polygon) may be manufactured in a dimension similar to a winding core for manufacturing an electrode assembly to be measured. Most preferably, the dimensions may be the same. In the current embodiment, for example, the cross section of the tip portion F of the base of the pressing plate 30 is a semi-circle having a radius R equal to a radius of the winding core.

The radius or size of the cross section of the tip portion F may be differently adjusted depending on the thickness, an active material type, or the like of the specimen 50 to be measured, but generally, the radius or size of the cross section of the tip portion F may be in a range of 0.48 to 1.48 mm corresponding to the half of the thickness 33 of the pressing plate 30. When force is measured by using the pressing plate 30 having the base of such a tip portion F, noise of a measurement value is minimized and measurement may be properly performed, and the specimen 50 may be bent in a similar manner as a winding situation. When the radius or size of the cross section of the tip portion F of the base of the pressing plate 30 is smaller than 0.48 mm, damage to the specimen 50 is increased and accuracy of the measurement value is decreased, and when the radius or size is greater than 1.48 mm, it is difficult for the specimen 50 to be plastic-deformed, and thus difficult to detect a difference between values of force before and after the plastic deformation.

Figure 5A:
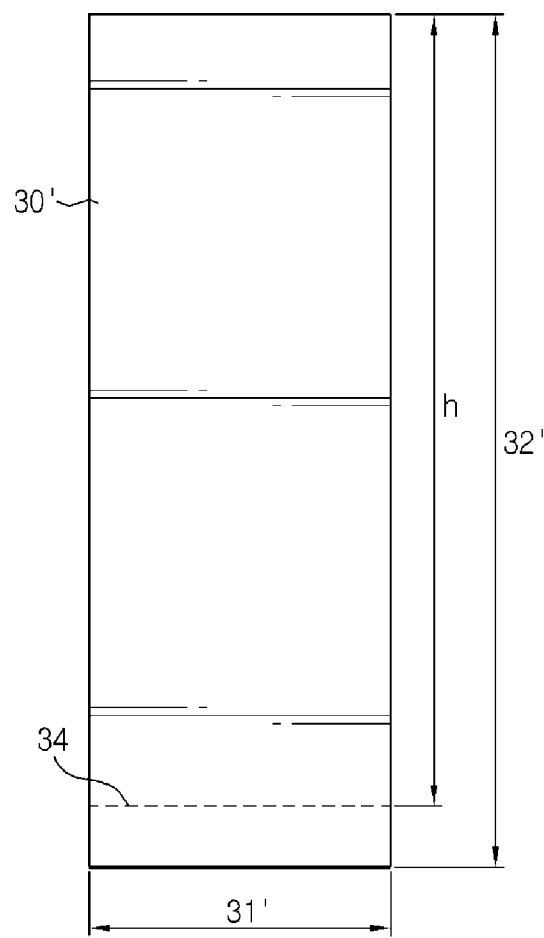
FIGS. 5A-B shows diagrams for describing a method of manufacturing the pressing plate of FIG. 4.
Figure 5B:
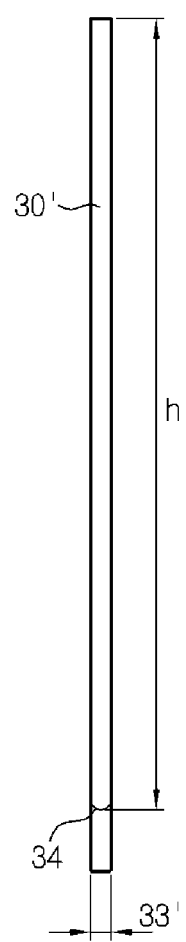

FIGS. 5A-5B show diagrams for describing a method of manufacturing the pressing plate 30 of FIG. 4, wherein FIG. 5A is a plan view of a pressing plate member 30' and FIG. 5B is a side view. For example, the pressing plate 30 of FIG. 4 may be manufactured via a method below when the width 31 is 50 mm, the length 32 is 50 mm, the thickness 33 is 1 mm, and the cross section of the tip portion F of the base is a semi-circle having a radius of 0.5 mm equal to a radius of a winding core.

First, the pressing plate member 30' having a width 31' and height 32' respectively of 50 mm and 55 mm as shown in FIG. 5A, and having a thickness 33' of 1 mm as shown in FIG. 5B is prepared. A processing line 34 is formed at a point of 40 mm in a direction of the height 32', i.e., at a point corresponding to the height h of the pressing plate 30. Then, the pressing plate member 30' is cut along the processing line 34. At this time, a rounding process providing a curve to a processing surface, i.e., an R work is performed to form the tip portion F of a semi-circle having a radius of 0.5 mm is formed.

Since an unnecessary friction coefficient may be generated in the specimen 50 according to a moving speed of the pressing plate 30 or the specimen 50 may be fracted by pressing of the pressing plate 30, it is necessary to secure an appropriate moving speed of the pressing plate 30. For example, the pressing plate 30 may move vertically downward at a speed of 0.5 to 2 mm/sec, and move downward at a speed of about 1 mm/sec. The driving unit B may descend the pressing plate 30 at such a speed and ascend the pressing plate 30 to an original position after force measurement is ended.

The tip portion F of the pressing plate 30 simulates a situation similar to bending of a winding core, and a test speed that is a control factor with respect to brittleness measurement is defined by a descending speed of the pressing plate 30. When the descending speed of the pressing plate 30 is similar to a winding speed, the situation may further approach the winding situation, but since a change of value of force is rapid, detailed classification of a displacement-force graph described below may not be possible. Accordingly, in the present disclosure, the descending speed of the pressing plate 30 may be 0.5 to 2 mm/sec, more preferably, about 1 mm/sec to obtain a detailed measurement value.

A material of the pressing plate 30 is not specifically limited as long as the material has strength to bend the specimen 50 and insert the specimen 50 into the groove 25. For example, the pressing plate 30 may be manufactured using aluminum, anodizing aluminum, or SUS. Although the material is not specifically limited as long as objects of the present disclosure are met, the material may be anodizing aluminum considering hardness or the like of an electrode itself that is a measurement target. Also, anodizing aluminum is preferable for durability of the pressing plate 30 since anodizing aluminum has strong ductility, has high anti-abrasion, is light-weighted, and is strong against oxidation. Considering process feasibility, costs, etc., SUS is preferable.

Figure 6:
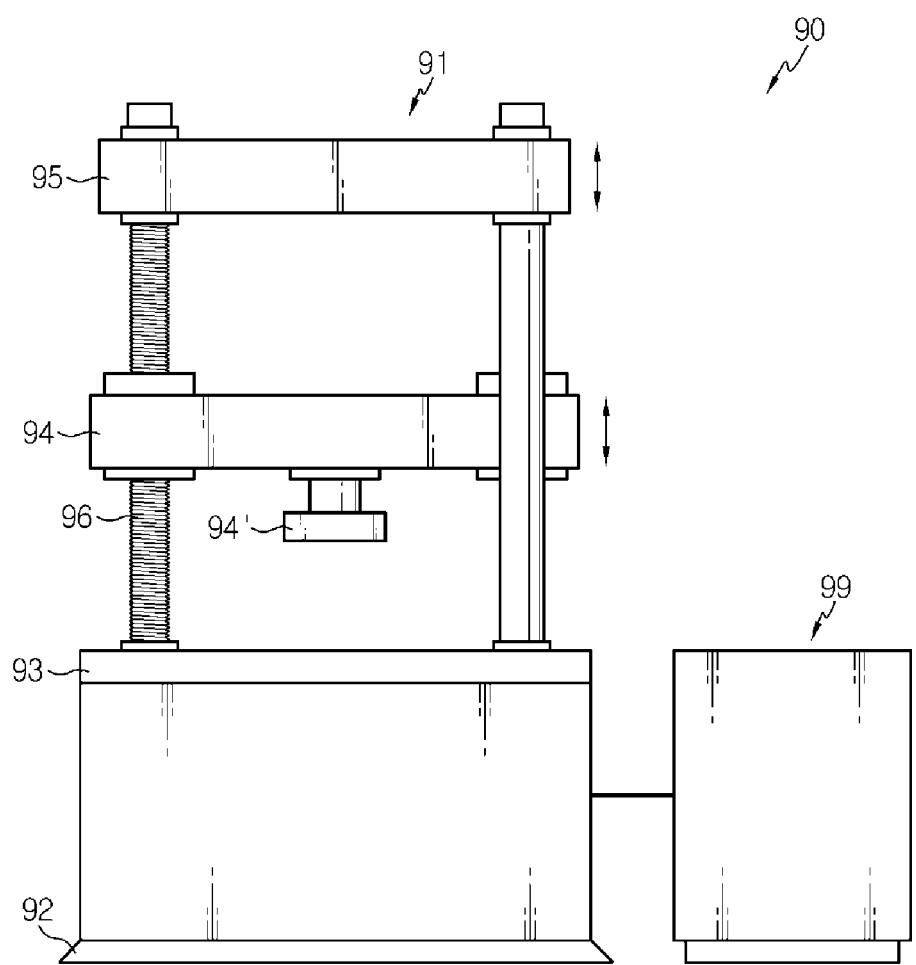
FIG. 6 is a diagram of an apparatus usable when a driving unit and a measurement analyzing unit are embodied in one apparatus in a brittleness evaluation apparatus, according to an embodiment of the present disclosure.

FIG. 6 is a diagram of a force measurement apparatus 90 usable when the driving unit B and the measurement analyzing unit C are embodied in one apparatus in the brittleness evaluation apparatus 10. The force measurement apparatus 90 of FIG. 6 is a type of UTM.

UTM is a general-purpose apparatus widely used to measure mechanical properties, and UTM of Instron is a representative apparatus. UTM may perform tests according to standards by changing only a specimen fixing grip based on tests. UTM performs various property tests on a specimen, and may measure various properties, for example, tensile strength, curve strength, and compression strength, in addition to various types of data, such as detachment strength, COF (constant friction, dynamic friction coefficient measurement), IFD, LID (hardness test), W curve, etc.

The force measurement apparatus 90 of FIG. 6 is a hydraulic UTM that measures force applied to the specimen 50 while descending the pressing plate 30, i.e., a test load. Such hydraulic UTM may be an analog type indicating a measurement value of load applied to the specimen 50 in analog or a digital display type displaying the measurement value on a distal display unit by using a potentiometer and a load cell that is an electronic sensor.

The force measurement apparatus 90 may include a load unit 91 and a control analyzing unit 99.

In the load unit 91, a table 93, a lower crosshead 94, and an upper crosshead 95 are arranged on a bed 92. The table 93 may be operated in a vertical direction by a hydraulic cylinder, the lower crosshead 94 may move in a vertical direction along a vertical screw bar 96 operated by a motor, and the upper crosshead 95 may be lifted in an upward direction along upward direction movement of the table 93. A grip for fixing the jig unit A may be mounted on the lower and upper crossheads 94 and 95. For example, when a grip 94' for holding and fixing the pressing plate 30 and the jigs 20 and 20' are placed on the table 93 such that the jig unit A in the brittleness evaluation apparatus 10 of FIG. 1 is mounted between the lower crosshead 94 and the table 93, both the driving unit B and the measurement analyzing unit C are connected to the jig unit A, and accordingly the brittleness evaluation apparatus 10 according to the present disclosure is realized and brittleness is evaluated by using the brittleness evaluation apparatus 10.

The control analyzing unit 99 may include various apparatuses for controlling operations of the hydraulic cylinder and the motor, a computer apparatus for measuring a load by the load unit 91 and displacement or the like of the specimen 50, receiving and recording measurement data, analyzing the measurement data according to a test analyzing program, and display the analyzed data on a monitor, etc.

When the jig unit A is placed between the lower crosshead 94 and the table 93 in the force measurement apparatus 90 as such, the pressing plate 30 is held and fixed by the grip 94', and then the lower crosshead 94 is descended via the control analyzing unit 99, the pressing plate 30 fixed to the grip 94' is vertically descended. At this time force applied to the specimen 50 is measured, recorded, analyzed, and displayed via the control analyzing unit 99.

Hereinafter, a brittleness evaluation apparatus according to another embodiment is described with reference to FIGS. 7 through 9. Details that are not specifically described below are the same as those of the brittleness evaluation apparatus 10 described above.

Figure 7:
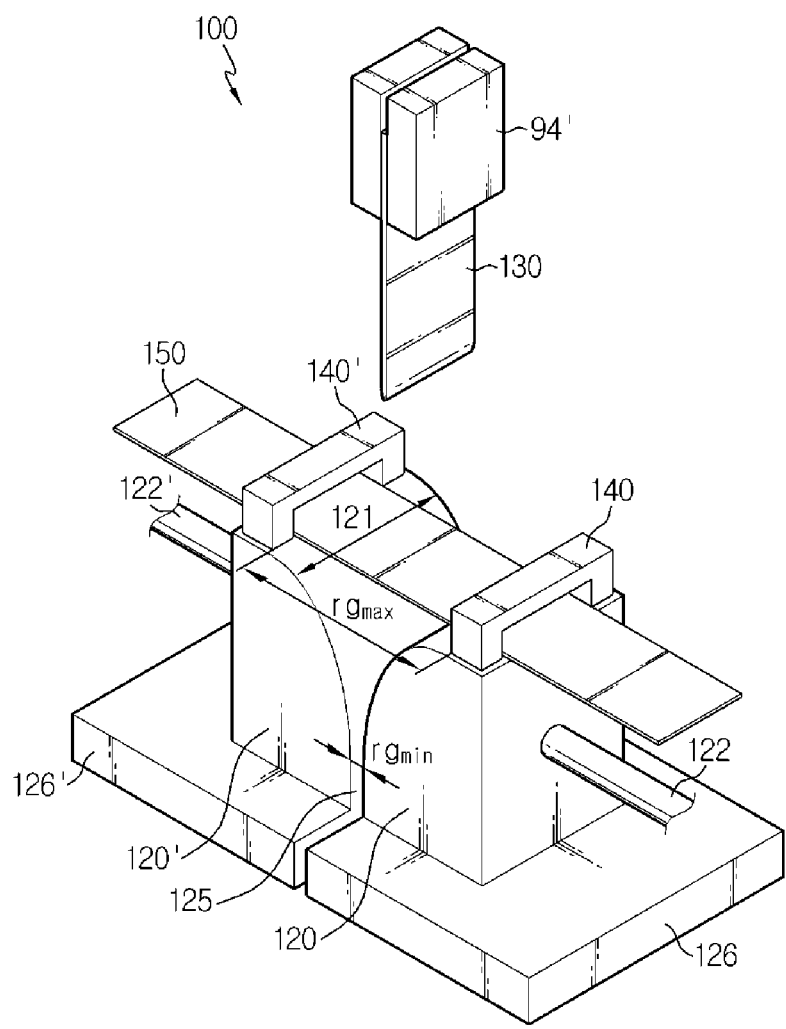
FIG. 7 is a perspective view of a brittleness evaluation apparatus according to another embodiment of the present disclosure.

FIG. 7 is a perspective view of a brittleness evaluation apparatus according to another embodiment of the present disclosure. FIG. 8 schematically illustrates a part of a view after a specimen is arranged on the brittleness evaluation apparatus according to the other embodiment of the present disclosure, and FIG. 9 schematically illustrates a part of a view where a specimen is inserted into a groove between oval jigs of the brittleness evaluation apparatus according to the other embodiment of the present disclosure.

Figure 8:
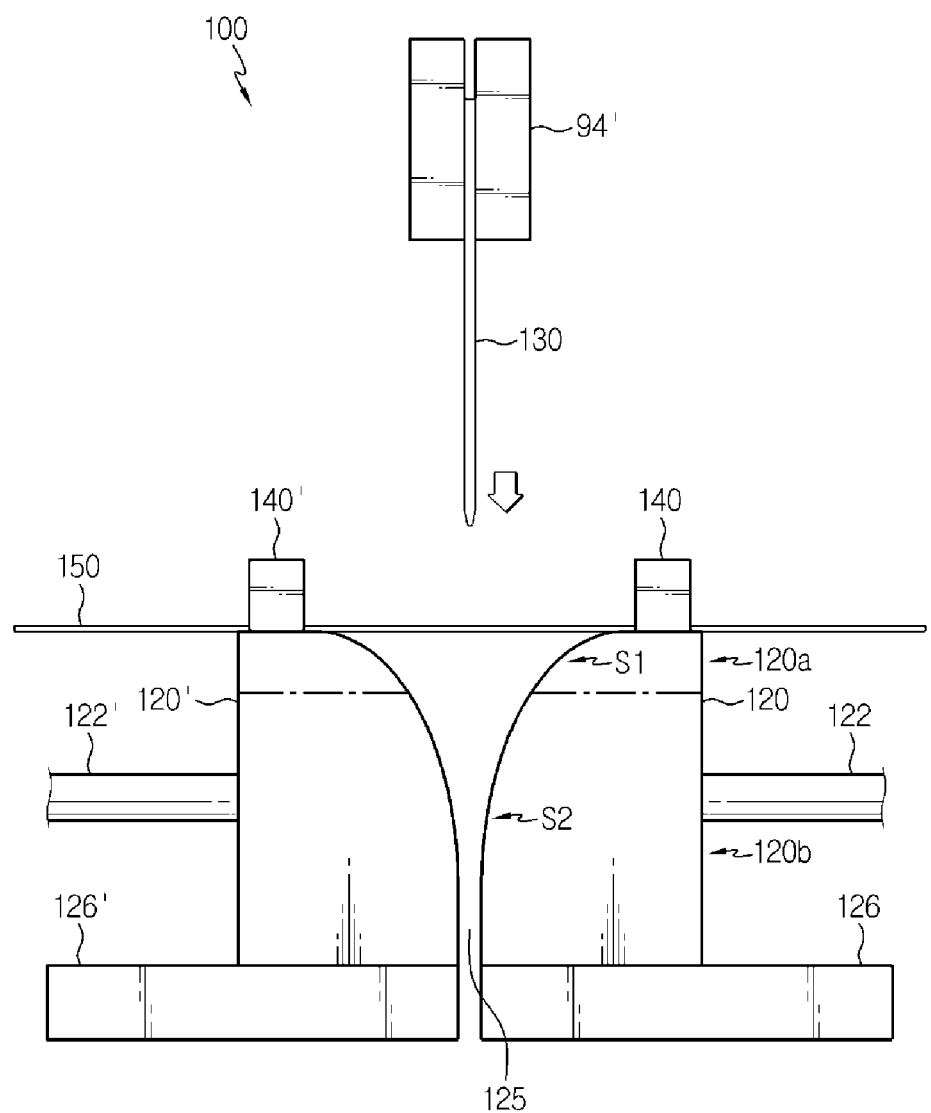
FIG. 8 schematically illustrates a part of a view after a specimen is arranged on the brittleness evaluation apparatus according to the other embodiment of the present disclosure.
Figure 9:
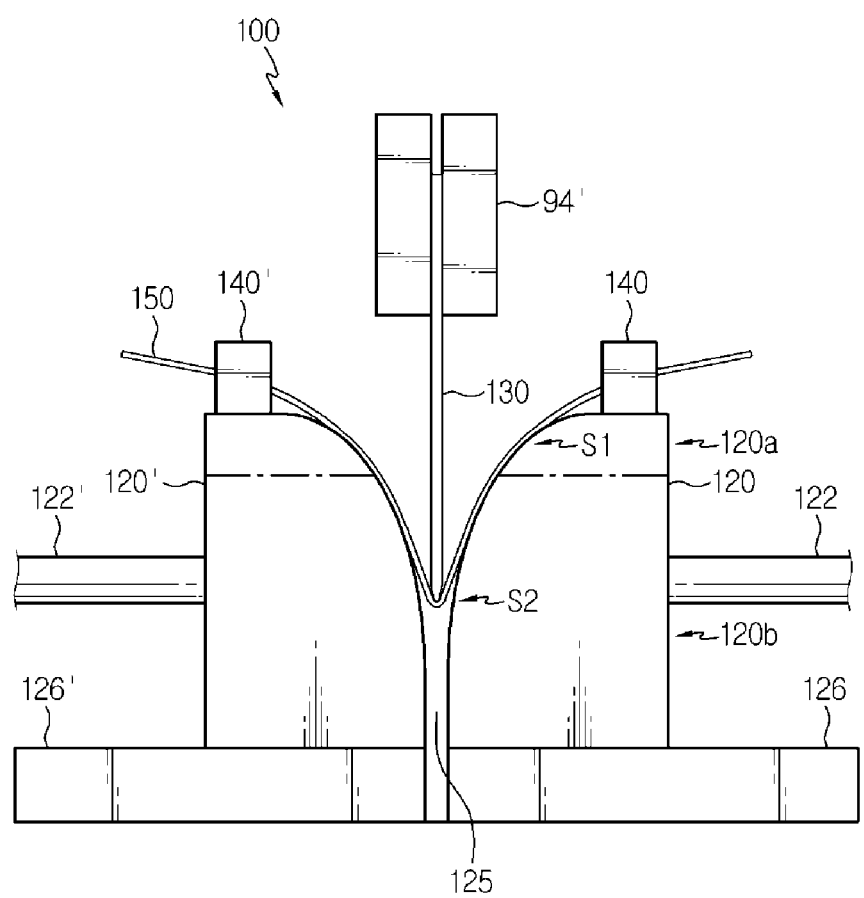
FIG. 9 schematically illustrates a part of a view where a specimen is inserted into a groove between oval jigs of the brittleness evaluation apparatus according to the other embodiment of the present disclosure.

Referring to FIGS. 7 through 9, a brittleness evaluation apparatus 100 includes two oval jigs 120 and 120' having top surfaces where a specimen 150 is placed formed in a horizontal plane, a pressing plate 130 for causing the specimen 150 to bend, guides 140 and 140' located respective on the oval jigs 120 and 120' and preventing distortion of the specimen 150, and a groove 125 that is a region formed between the two oval jigs 120 and 120' and into which the specimen 150 is inserted by the pressing plate 130.

The oval jigs 120 and 120' are similar to a ¼ oval shape and are manufactured substantially in the same shapes such that arc portions are arranged to symmetrically face each other based on the groove 125. For convenience of description, as in the above embodiment, when surfaces of the oval jigs 120 and 120' facing each other are referred to as 'front' and opposite surfaces are referred to 'back', the oval jigs 120 and 120' are arranged such that the front face each other.

The oval jigs 120 and 120' form the horizontal plane at the top surfaces where the specimen 150 is placed, form curved surfaces S1 at an inlet of the groove 125 at the front of the oval jigs 120 and 120' with a large amount of inclination change, and form surfaces S2 at the bottom of the oval jigs 120 and 120' with no or small amount of inclination change thereby forming the groove 125 that is almost vertical at the bottom of the oval jigs 120 and 120'.

Accordingly, a size $rg_{max}$ of the inlet of the groove 125 formed in the oval jigs 120 and 120', i.e., a maximum interval between the oval jigs 120 and 120' or a maximum value of the width of the groove 125 is remarkably large compared to a width $rg_{min}$ at the bottom of the groove 125. For example, the size $rg_{max}$ of the inlet of the groove 125 may be about 50 mm whereas the width $rg_{min}$ at the bottom of the groove 125 is designed to be about 1 mm. Meanwhile, a top portion 120a of the oval jigs 120 and 120' whose front forms the curved surfaces S1 with the large amount of inclination change is present over a relatively short portion compared to a bottom portion 120b, whereas the bottom portion 120b of the oval jigs 120 and 120' whose front forms the surface S2 with no or small amount of inclination change is present over a relatively long portion compared to the top portion 120a. Accordingly, at the early measurement, as the specimen 150 is bent smoothly along a curve of the groove 125, the size of force applied to the specimen 150 is divided and thus the force is accurately measured, and while measurement is performed in earnest, the pressing plate 130 moves downward slowly such that a change of force applied to the specimen 150 is continuously measured with sufficient time.

The oval jigs 120 and 120' may support the specimen 150 while the force is applied to the specimen 150 by the pressing plate 130, and are not specifically limited in terms of material as long as movement of the specimen 150 is not specifically resisted. Also, a thickness or width 121 of the oval jigs 120 and 120' is not specifically limited as long as the thickness or width 121 is suitable for measurement.

Since the specimen 150 placed on the top surfaces of the oval jigs 120 and 120' moves along the curve of the groove 125 by being pressed by the pressing plate 130, it is preferable that friction is not generated in the specimen 150 from the oval jigs 120 and 120'. In this regard, it is preferable that the oval jigs 120 and 120' have a friction coefficient of 0, but since it is realistically not easy or not possible to manufacture the oval jigs 120 and 120' having a friction coefficient of 0, the oval jigs 120 and 120' may be manufacture to have a friction coefficient close to 0.

The oval jigs 120 and 120' may be manufactured integrally with supporting ends 126 and 126' as shown in FIGS. 7 through 9, but are not limited thereto. The supporting ends 126 and 126' may be manufactured to have a wider area than the bottom of the oval jigs 120 and 120' so as to prevent the oval jigs 120 and 120' from shaking or falling. When the oval jigs 120 and 120' are set to be spaced apart from each other by a certain distance, not only the oval jigs 120 and 120' but also the supporting ends 126 and 126' may be set to be spaced apart from each other as shown in FIGS. 7 through 9.

Horizontal bars 122 and 122' are connected respectively to the back of the oval jigs 120 and 120' to adjust a distance between the oval jigs 120 and 120', and thus the oval jigs 120 and 120' may move farther from or closer to each other in both sides in a horizontal direction based on the pressing plate 130 or the groove 125. The distance may be adjusted in micrometer units.

The guides 140 and 140' for preventing the specimen 150 from distorting is provided respectively on the top surfaces of the oval jigs 120 and 120'. When the thickness of the specimen 150 is decreased to micrometer units, bending is easily occurred to such an extent that the specimen 150 sags due to its own weight. For example, with respect to a method of measuring bending strength of a sample by vertically descending a load applying member to instantaneously fracture the sample, a distortion effect of the sample is not relatively large, but in the present disclosure, since the change of force applied to the specimen 150 is continuously measured by slowly descending the pressing plate 130, a component for preventing distortion of the specimen 150 is necessary. Thus, the present disclosure proses the guides 40 and 40' as described in the previous embodiment and the guides 140 and 140' as described in the current embodiment.

The guides 140 and 140' may be provided on the oval jigs 120 and 120', in more detail, on the top surfaces of the oval jigs 120 and 120' forming the horizontal plane.

In FIGS. 7 through 9, the guides 140 and 140' are not limited to the illustrated shape. For example, the guides 140 and 140' may have a shape similar to the guides 40 and 40' described above in the previous embodiment. In particular, a case where the interval between the both side wall portions 44 at the guide 40 is uniform along the direction of the height h of the both side wall portions 44, which is the simplest shape, is illustrated.

The specimen 150 is placed between the guides 140 and 140' and the top surfaces of the oval jigs 120 and 120', and here, the guides 140 and 140' may be attached or fixed to the top surfaces of the oval jigs 120 and 120' in a region excluding a portion where the specimen 150 is placed. A method of attaching or fixing the guides 140 and 140' to the oval jigs 120 and 120' is not specifically limited, and for example, a taping, adhesive, screw, welding, or soldering method may be applied as described in the previous embodiment.

The guides 140 and 140' may be designed to be spaced apart from the top surfaces of the oval jigs 120 and 120', i.e., to have a uniform height, except in the portions fixed to the oval jigs 120 and 120'. By being designed to be spaced apart as such, when the specimen 150 placed on the top surfaces of the oval jigs 120 and 120' is inserted into the groove 125 by the pressing plate 130, there may be no or minimum interference or effect due to friction with the guides 140 and 140'. The spaced height may be designed to be the same at both the guides 140 and 140' placed on the top surfaces of the oval jigs 120 and 120'. The guides 140 and 140' may be spaced apart from the top surface of the oval jigs 120 and 120' at a height in a range of 1 to 10 mm, for example, about 3 mm. For example, when the guides 140 and 140' have the same shape as the guides 40 and 40' as described in the previous embodiment, the height h of the both side wall portions 44 is about 3 mm.

The guides 140 and 140' may be arranged to be spaced apart from a side surface of the specimen 150 such as not to affect measurement of force applied to the specimen 150 by the pressing plate 130. For example, when the guides 140 and 140' have the same shape as the guides 40 and 40' as described in the previous embodiment, the interval between the both side wall portions 44 is greater than the width of the specimen 150. When the guides 140 and 140' are spaced apart from the side surface of the specimen 150 too narrowly, it is difficult to achieve an object of bending the specimen 150 along the curves of the oval jigs 120 and 120'. For example, when the guides 140 and 140' have the same shape as the guides 40 and 40' as described in the previous embodiment and the interval between the both side wall portions 44 is uniform along the direction of the height h of the both side wall portions 44, the interval between the both side wall portions 44 may be about 22 mm in an example where the width of the specimen 150 is about 20 mm.

Also, the guides 140 and 140' should not affect force applied to the specimen 150 by the descending of the pressing plate 130. In this regard, the guides 140 and 140' may have a friction coefficient of 0, and even when it is not easy to manufacture the guides 140 and 140' having a friction coefficient of 0, it is preferable to manufacture the guides 140 and 140' to have a friction coefficient close to 0.

For example, when the guides 140 and 140' are formed of a material having a relatively high friction coefficient, a height spaced apart from the oval jigs 120 and 120' may be designed to be high, and when the guides 140 and 140' are formed of a material having a relatively low friction coefficient, the height spaced apart from the oval jigs 120 and 120' may be designed to be low. Preferably, the guides 140 and 140' may be manufactured from aluminum.

The pressing plate 130 may be the same as the pressing plate 30 of FIG. 4.

Meanwhile, the oval jigs 120 and 120', the pressing plate 130, and the guides 140 and 140' of the brittleness evaluation apparatus 100 of FIGS. 7 through 9 may be used instead of the jig unit A of the brittleness evaluation apparatus 10 of FIG. 1. Accordingly, the pressing plate 130 of the brittleness evaluation apparatus 100 may be, for example, mounted on the grip 94' of the force measurement apparatus 90 described with reference to FIG. 6 to be used for brittleness evaluation.

Also, in terms of diversity of a brittleness evaluation apparatus of the present disclosure, components of the brittleness evaluation apparatus 10 described with reference to FIGS. 1 through 6 and the brittleness evaluation apparatus 100 described with reference to FIGS. 7 through 9 may be selectively combined or modifiably combined. For example, the guides 40 and 40' of the brittleness evaluation apparatus 10 and the oval jigs 120 and 120' of the brittleness evaluation apparatus 100 may be combined.

Figure 10:
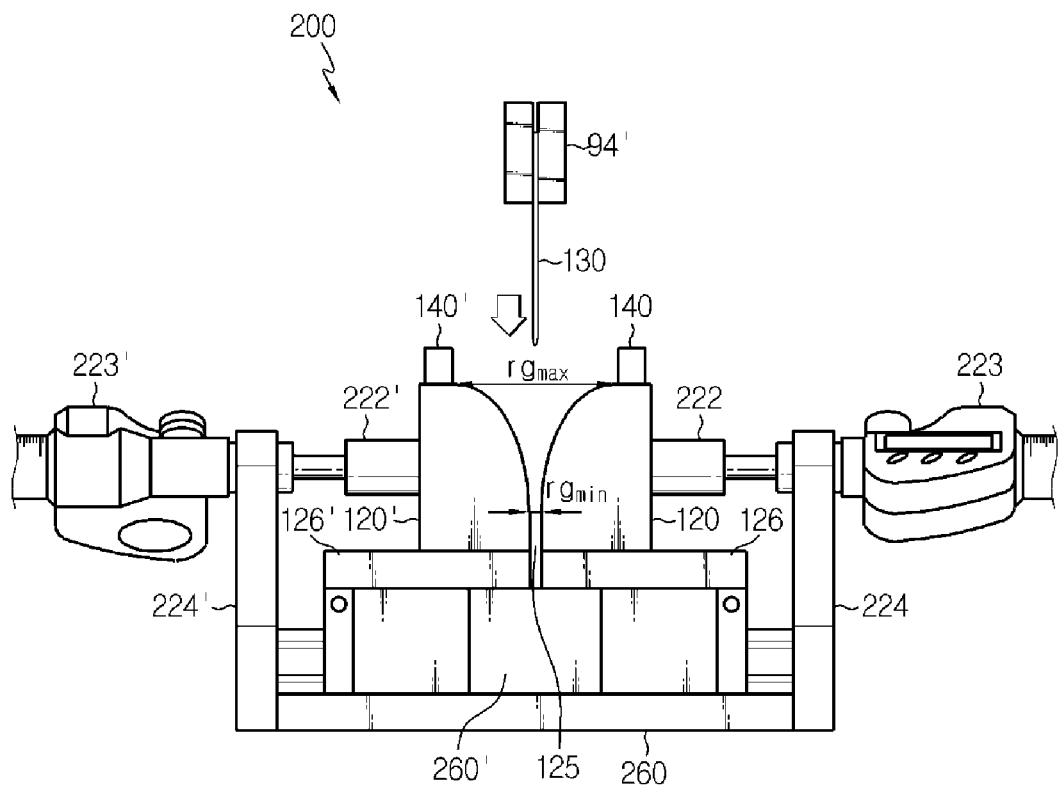
FIG. 10 is a front view of a brittleness evaluation apparatus according to another embodiment of the present disclosure.

FIG. 10 is a front view of a brittleness evaluation apparatus according to another embodiment of the present disclosure.

A brittleness evaluation apparatus 200 of FIG. 10 is a real product manufactured by realizing the brittleness evaluation apparatus 100 described with reference to FIGS. 7 through 9 in an actual experimental level. Referring to FIG. 10, each component of the brittleness evaluation apparatus 100 is almost exactly realized. The guides 140 and 140' are prepared in a shape similar to the guides 40 and 40' described in the previous embodiment, and the guides 140 and 140' are fixed on the oval jigs 120 and 120' via a taping method in FIG. 10.

Meanwhile, the horizontal bars 122 and 122' in the brittleness evaluation apparatus 100 are realized as horizontal bars 222 and 222' in the brittleness evaluation apparatus 200, and micrometer type adjusters 223 and 223' are respectively mounted on the horizontal bars 222 and 222' for precise interval adjustment. A commercial product having functions of preset, zero/ABS, hold, etc. may be used as the adjusters 223 and 223'. Meanwhile, the horizontal bars 222 and 222' are supported by supports 224 and 224' provided respectively at the back of the oval jigs 120 and 120', and the supporting ends 126 and 126' and the supports 224 and 224' are provided on a wide base member 260 at the lowermost, thereby aiming at stability of overall structure of a jig unit basically including the oval jigs 120 and 120', the pressing plate 130, and the guides 140 and 140'. A gauge member 260' having a top surface on which the interval between the oval jigs 120 and 120' is displayed in gradations to recognize the interval at a glance is provided at the base member 260 for measurement convenience. Zero-point adjustment is facilitated via the gauge member 260'.

Such a brittleness evaluation apparatus 200 may be used for brittleness evaluation by mounting the pressing plate 130 on the grip 94' of the force measurement apparatus 90 described in FIG. 6 and placing a portion installed in the base member 260 on the table 93 of the force measurement apparatus 90 described in FIG. 6. In experiment examples hereinafter, a jig unit of such a brittleness evaluation apparatus 200 is mounted on UTM of INSTRON equipment, and force measurement and brittleness evaluation are performed by adjusting a test analyzing program of the equipment according to a brittleness evaluation method of the present disclosure.

Hereinafter, a method of evaluating brittleness by using a brittleness evaluation apparatus according to the present disclosure is described. A method of measuring force by using the brittleness evaluation apparatus of the present disclosure may be performed in an ambient atmosphere and at a room temperature (25° C.), and units of the measured force may be expressed differently in g, gf, N, or the like based on specification of the measurement analyzing unit C, and although the measured force is expressed in "g" units, the unit is not limited thereto.

The brittleness evaluation method according to the present disclosure may be performed by using the brittleness evaluation apparatuses 10, 100, and 200 described in the above embodiments and preparing the specimen 50 or 150 from an electrode.

The present disclosure provides a method of checking a brittleness/ductility level of a specimen from an overall shape of a displacement-force graph measured with respect to the specimen, and a method of determining a size of a brittleness value. According to the present disclosure, a new parameter called the brittleness value may be obtained by determining a change of values of force before and after plastic deformation of the specimen.

In the brittleness evaluation method according to the present disclosure, after arranging the specimen 50 or 150 on the brittleness evaluation apparatus according to the present disclosure, such as the brittleness evaluation apparatuses 10, 100, and 200, the pressing plate 30 or 130 is descended via the driving unit B, and force applied to the specimen 50 or 150 is measured via the measurement analyzing unit C while the pressing plate 30 or 130 is descended.

The specimen 50 or 150 may be arranged by pushing the specimen 50 or 150 from one side such that the specimen 50 or 150 sequentially passes from one side of any one of the guides 40 and 40' to the penetrating portions 46 of the guides 40 and 40'. As described above, as the driving unit B and the measurement analyzing unit C, the force measurement apparatus 90 of UTM type may be used or UTM of Instron actually widely used as UTM may be used by changing the test analyzing program according to the brittleness evaluation method of the present disclosure. The pressing plate 30 or 130 is descended until plastic deformation is occurred in the specimen 50 or 150 or until the pressing plate 30 or 130 contacts the groove 25 between the jigs 20 and 20' or the groove 125 between the oval jigs 120 and 120'. Then, a "displacement-force graph" is obtained by indicating specimen displacement as X-axis and a measured value of force as a Y-axis. A brittleness/ductility level may be evaluated from a shape of the displacement-force graph obtained as such, or a brittleness value that is a difference between values of force before and after the plastic deformation of the specimen 50 or 150 is obtained from the displacement-force graph.

Figure 11:
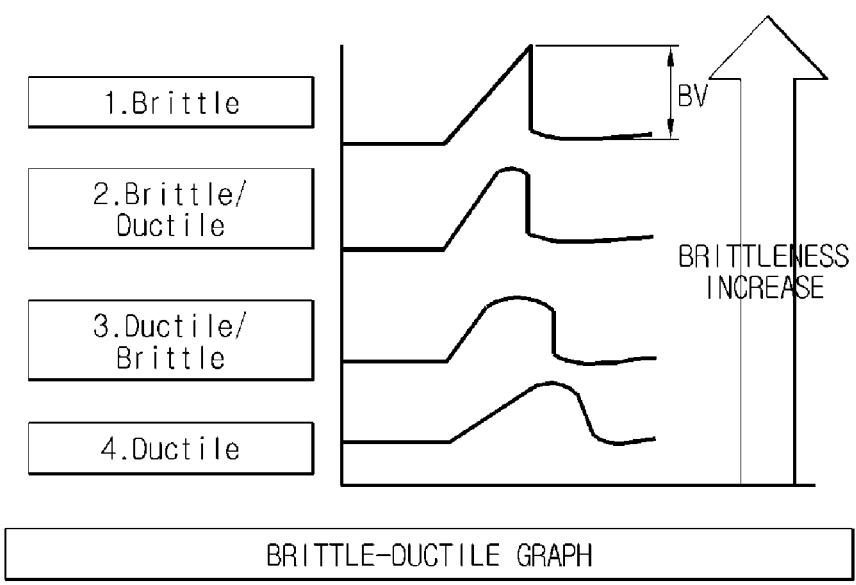
FIG. 11 schematically illustrates graph characteristics shown in four types of electrode specimen having different brittleness/ductility levels.

FIG. 11 schematically illustrates four displacement-force graphs having different characteristics in terms of brittleness/ductility levels. Here, an X-axis denotes displacement (mm units) and may be understood as denoting a lapse of time, and a Y-axis may be understood as denoting force applied to a specimen. Generally, plastic deformation of a specimen is occurred within a very short period of time. Thus, an X-axis value is fixed so as not to consider an X value, and only the difference between the values of force before and after the plastic deformation, i.e., a difference of Y-axis values is considered. In other words, in the present specification, a value when force received by a specimen when the force is applied by the specimen is the highest and a value where the force is decreased and inflected afterward are determined by using the brittleness evaluation apparatus, and a difference between the two values is obtained to define a new parameter of brittleness value. The brittleness value is obtained by determining the change of force before and after the plastic deformation of the specimen, and the brittleness value may be quantified through coefficients of the Y-axis indicating force. Units of the brittleness value may be Kgf that is units of force or may be Kgf/mm or Kgf/sec that is a conversion unit considering displacement or time.

The first top graph among the displacement-force graphs of FIG. 11 shows that a value of force linear functionally increases from the moment force is applied to a specimen, but suddenly decreases as he specimen is fractured afterward. In other words, the first top graph corresponds to a case where the specimen suddenly fractures without elongation when force is applied, and in the present disclosure, the specimen having such a displacement-force graph is defined as brittle.

The second top graph among the displacement-force graphs of FIG. 11 shows that a value of force linear functionally increases from the moment force is applied to a specimen, but afterwards, suddenly decreases as the specimen is fractured after a momentary plateau state. In other words, the second top graph corresponds to a case where the specimen is fractured after short elongation when force is applied, and in the present disclosure, the specimen having such a displacement-force graph is defined as brittle/ductile.

Also, the third top graph among the displacement-force graphs of FIG. 11 shows that a value of force increases from the moment force is applied to a specimen and decreases as the specimen is fractured after a relatively long plateau state. In other words, the third top graph corresponds to a case where the specimen is elongated after being partially fractured when force is applied, and in the present disclosure, the specimen having such a displacement-force graph is defined as ductile/brittle.

Lastly, in the fourth graph at the bottom among the displacement-force graphs of FIG. 11, an inflection point is not clearly shown and it is difficult to clearly find a part indicating specimen fracture. Such a case occurs in a specimen having ductility, and in the present disclosure, the specimen having such a displacement-force graph is defined as ductile.

As such, it was found that displacement-force graphs having detailedly different shapes may be obtained based on situations, such as elongation, fracture, etc. of a specimen when a descending speed of the pressing plate 30 or 130 is slow at a level of 1 mm/sec, and in the present disclosure, the four cases were divided into brittle, brittle/ductile, ductile/brittle, and ductile so as to qualitatively evaluate which one of four brittleness/ductility levels a specimen belongs from a displacement-force graph obtained after measurement. A level of property, i.e., a brittleness/ductility level, may be determined based on an overall shape of a displacement-force graph. It may be determined that a specimen is ductile when a graph is approximately round and has a smooth inclination as the fourth graph, and that brittleness is gradually increasing when a graph has gradual steep inclination or is sharp as from the third to first graphs (indicated as brittleness increase by an arrow in FIG. 11).

When the descending speed of the pressing plate 30 or 130 is very fast, a test speed may be increased but a change of values of force may be rapid, and thus it is difficult to obtain a detail measurement value and it is unable to obtain the four types of displacement-force graphs as shown in FIG. 11. Thus, the present disclosure is largely different from a method of determining a changing aspect of a specimen by generally applying an impact by a load in terms of the descending speed of the pressing plate 30 or 130. Since deformation rapidly occurs, most displacement-force graphs are shown as brittle as in the first graph of FIG. 11. As such, the present disclosure has a high level of technology in that the descending speed of the pressing plate 30 or 130 is adjusted to an optimum test speed such that, while a situation similar to winding and curving is already simulated via the tip portion F of the pressing plate 30 or 130, a difference according to a property, such as brittleness or ductility is shown through a displacement-force graph.

As such, when a displacement-force graph, in which an X-axis denotes specimen displacement and a Y-axis denotes a value of force applied to a specimen, is shown by using the brittleness evaluation method of the present disclosure, an aspect of a crack generated in an active material layer of an electrode may be qualitatively evaluated to be one of brittleness/ductility levels from a shape of the graph.

Also, from the displacement-force graphs of FIG. 11, it is determined that a point of time when plastic deformation is occurred in the specimen is indicated by an inflection point on the graph. Accordingly, it is also proposed that a specimen plastic deformation time may be estimated by checking an inflection point on the displacement-force graph.

Further, it is proposed to obtain the brittleness value that is the difference between values of force before and after the plastic deformation of the specimen from the displacement-force graph. A difference between the value when force received by the specimen is the highest and the value at a point where the force is decreased and inflected afterward on the displacement-force graph may be referred to as the brittleness value. For example, the first graph among the displacement-force graphs of FIG. 11 indicates a value indicated by a brittleness value BV.

Such a brittleness value is a parameter that may be specified into a value. For example, when it is determined that a crack is generated in an electrode active material layer in a case where a brittleness value measured according to the present disclosure is greater than 30 g/mm, and that a crack is not generated in the electrode active material layer when the brittleness value is smaller than 20 g/mm, the brittleness values 20 g/mm and 30 g/mm may be set as specification. More preferably, specification may be set such that an electrode has a brittleness value smaller than or equal to about 15 g/mm, and most preferably, smaller than or equal to 10 g/mm.

Figure 12:
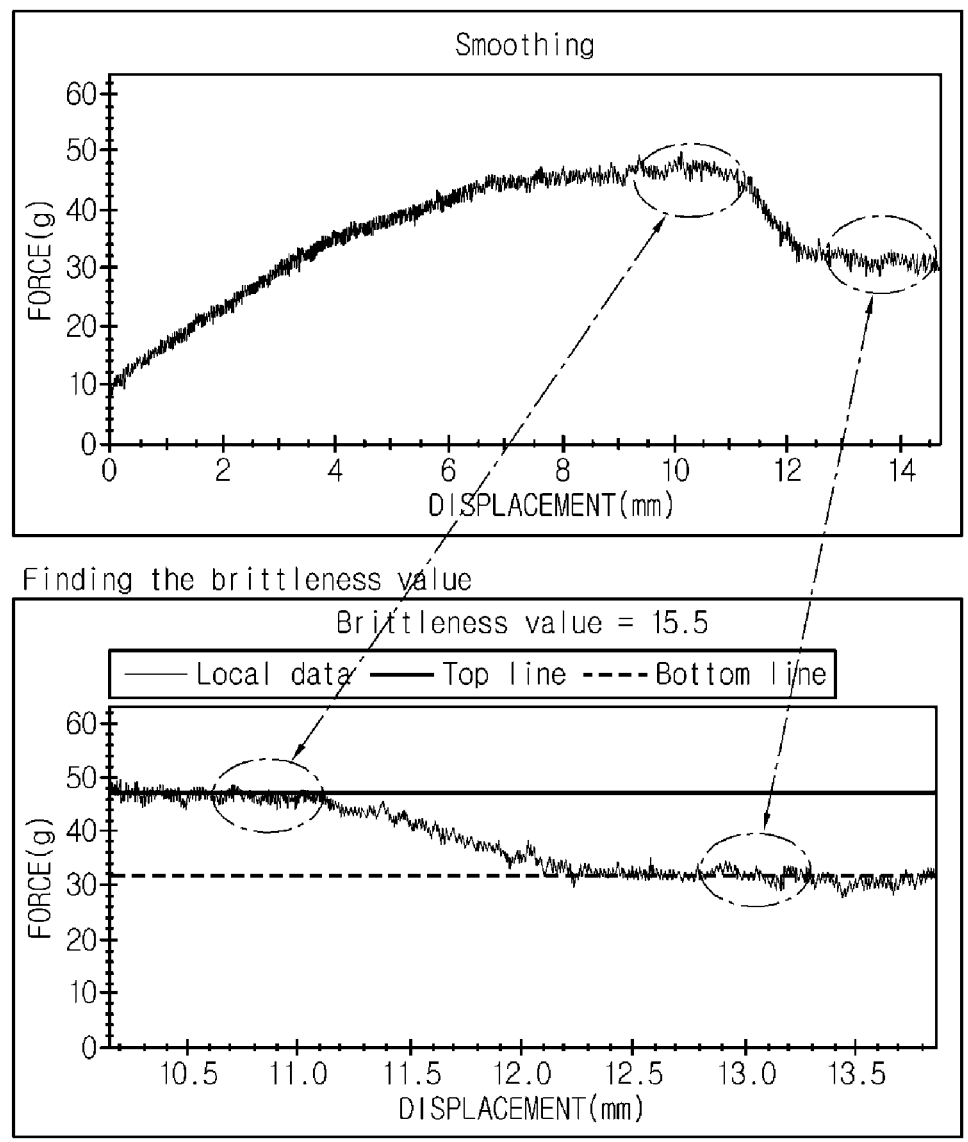
FIG. 12 shows displacement-force graphs obtained by using a brittleness evaluation apparatus of the present disclosure.

FIG. 12 shows displacement-force graphs obtained by using a brittleness evaluation apparatus of the present disclosure, wherein top and bottom graphs are indicated by varying X-axis scales (a part of X-axis section of the top graph is expanded and displayed in detail in the bottom graph). From the graphs shown in FIG. 12, it is determined that an electrode has a brittleness value of 15.5 g/mm. Since the specification defined in the above, for example, the brittleness value smaller than or equal to 20 g/mm is satisfied, the electrode may be determined to have a preferable electrode property (brittle). Also, since an inflection point is not clearly shown in view of an overall shape of the displacement-force graph, the electrode may also be determined to be ductile/brittle.

A crack riskiness may be determined considering both a type of the displacement-force graphs and brittleness value of FIG. 11. Since the shape of the displacement-force graph is ductile and has low brittle as the brittleness value is small, it may be determined that the crack riskiness is low.

As such, it should be noted that the present disclosure is very different from an existing three-point bending in terms of a measured value and an evaluation method using the measured value.

In the existing three-point bending, there is no groove between jigs supporting a specimen and even if there is a groove, a width thereof is uniform, and a bending reaction is measured by performing the three-point bending. In the present disclosure, a change of force when specimen is bent by inserting a pressing plate into a groove whose width gradually decreases is mainly measured.

Also, in the existing three-point bending, a value that is quantified is a bending angle degree. On the other hand, in the present disclosure, shapes of four types of displacement-force graphs are obtained and a brittleness value is obtained by quantifying a difference between values of force before and after plastic deformation during bending. Also, a level of property, i.e., a brittleness/ductility level is determined using an overall shape of the displacement-force graph.

As such, according to the present disclosure, a ductility/brittleness level is evaluated with respect to an electrode before winding after being rolled, and a crack riskiness, i.e., possibility of crack generation may be predicted when the electrode is used, based on the level.

Accordingly, the present disclosure may be used for usage suitability prior verification of an electrode before winding. For example, after manufacturing a pre-established electrode into a specimen, the specimen is tested and when a brittleness value is large, possibility of crack generation is determined to be high and the electrode may be determined to be not suitable for use of a roll-type electrode assembly. In this case, an electrode manufacture recipe may be changed or introduction of an electrode having new specification is reviewed.

Also, the present disclosure may be used to specify an electrode property accordingly. For example, it may be pre-specified what brittleness value an electrode suitable for manufacturing a secondary battery should have. When an electrode is produced via an established regular electrode manufacturing process and the brittleness evaluation method according to the present disclosure is performed to inspect the quality of the produced electrode, it may be determined whether specification of the electrode is satisfied or dissatisfied. An electrode dissatisfying the specification is excluded from a following assembling process and reasons thereof are investigated. For example, it may be investigated in which line in the established manufacturing process has a variable to find and correct causes. As such, the present disclosure may be used to exclude an electrode dissatisfying the specification during specification and following inspections.

In particular, the brittleness evaluation method according to the present disclosure may be used to monitor and manage properties of an electrode currently produced. It is determined whether an electrode higher ductility or higher brittleness through a shape of a displacement-force graph. Also, quantified brittleness values may be collected to select suitable specification, and such specification standards may be used to monitor and manage produced electrodes. Effects of improving the properties of electrodes may be quantified.

Figure 13:
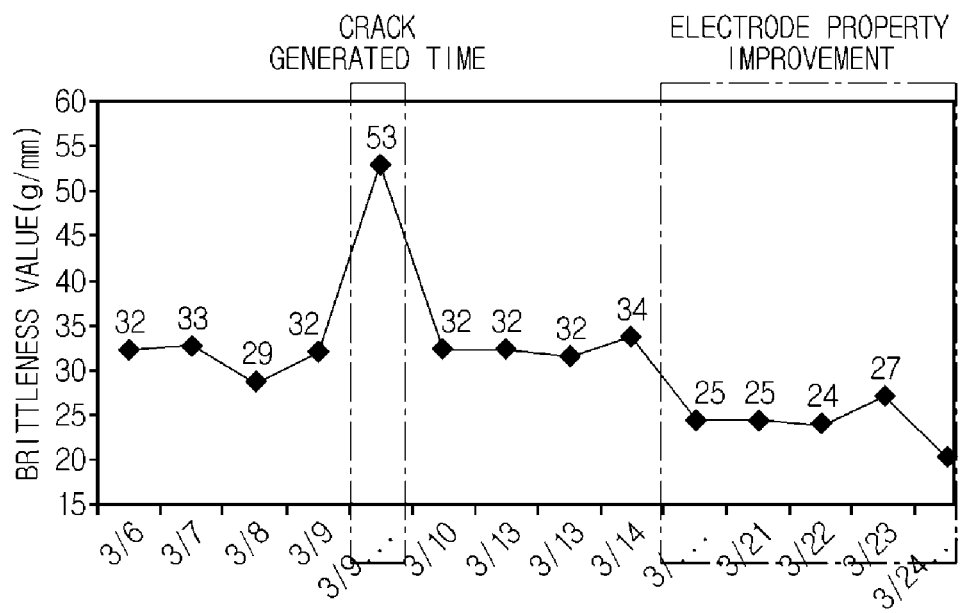
FIG. 13 illustrates an example in which plastic deformation of an electrode specimen is determined via a brittleness evaluation method of the present disclosure, and then it is checked that electrode plastic deformation is not occurred by improving an electrode.

For example, FIG. 13 illustrates an example in which plastic deformation of an electrode specimen is determined via the brittleness evaluation method of the present disclosure, and then it is checked that electrode plastic deformation is not occurred by improving an electrode.

Referring to FIG. 13, an X-axis denotes dates (time) and a Y-axis denotes a brittleness value (average).

A brittleness value was measured and recorded almost every day from a date of March 6. The brittleness value of an electrode specimen was obtained via a test analyzing program while calculating and recording an average of 5 points before and after a specimen plastic deformation region or a crack generation region. It has been monitored that the brittleness values of about 32 g/mm of were shown from March 6 to March 14, and a high brittleness value of 53 g/mm was recorded on March 9. This was determined to be a crack generated time. After checking crack generation, an electrode was manufactured by varying an electrode rolling degree, and brittleness values of the electrode were recorded after March 14. As shown in the right box of the graph of FIG. 13, the brittleness value was measured to be about 25 g/mm that is lower than the previous brittleness values. Accordingly, it was determined that electrode properties are improved by adjusting the electrode rolling degree.

From the result of FIG. 13, an effect in which the brittleness value is decreased from the average of 32 g/mm to 25 g/mm after adjusting the electrode rolling degree was verified, and it was concluded that the properties improved by 22% compared to the previous properties.

As such, according to the present disclosure, an effect of improving electrode properties (for example, adjusting a rolling degree) may be quantified (for example, brittleness value of 25 g/mm), and the effect is numerically comparable (for example, 22% improvement) with previous electrode properties after improving the electrode properties.

Figure 14:
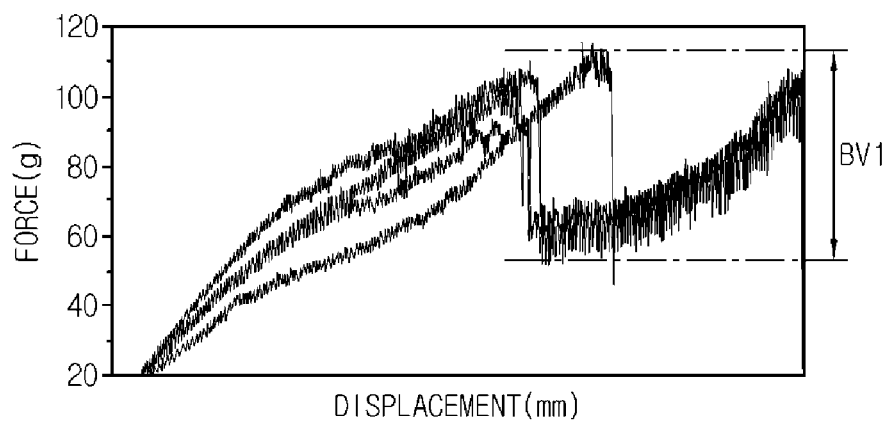
FIG. 14 is a displacement-force graph obtained by using a brittleness evaluation apparatus of the present disclosure with respect to an electrode manufactured in Example 1.
Figure 15:
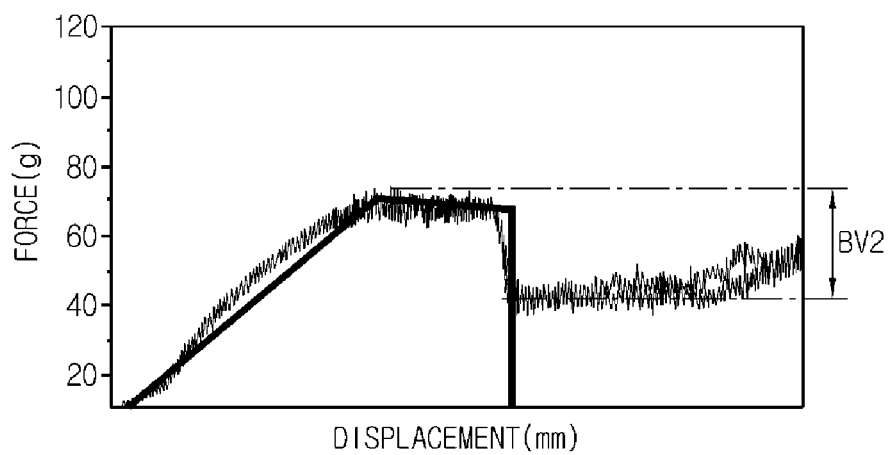
FIG. 15 is a displacement-force graph obtained by using a brittleness evaluation apparatus of the present disclosure with respect to an electrode manufactured in Example 2.
Figure 16:
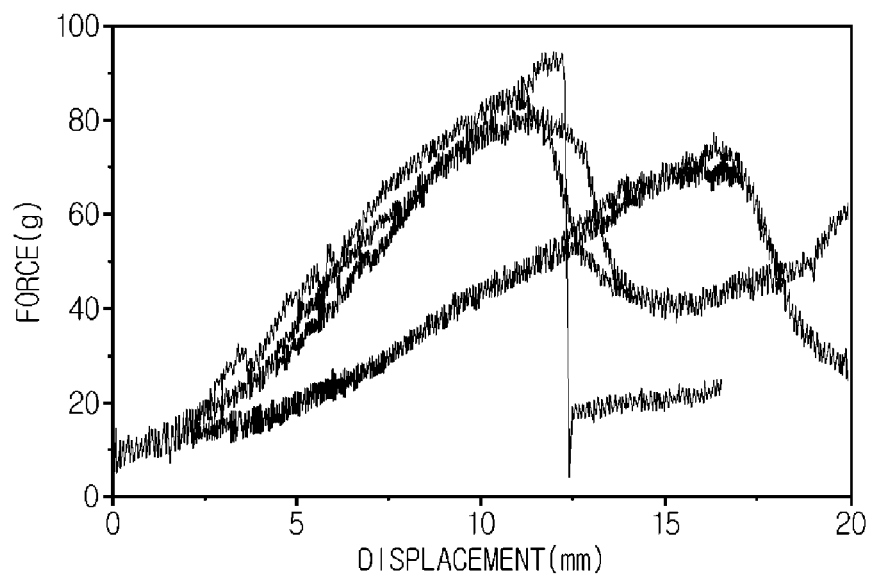
FIG. 16 is a displacement-force graph obtained by using a brittleness evaluation apparatus of the present disclosure without a guide with respect to the electrode manufactured in Example 2, as Comparative Example.

Hereinafter, the present disclosure is described in detail with reference to examples and comparative examples. FIG. 14 is a graph obtained by using the brittleness evaluation apparatus of the present disclosure with respect to an electrode manufactured in Example 1. FIG. 15 is a graph obtained by using the brittleness evaluation apparatus of the present disclosure with respect to an electrode manufactured in Example 2. FIG. 16 is a graph obtained by using the brittleness evaluation apparatus of the present disclosure without a guide with respect to the electrode manufactured in Example 2, as a Comparative Example.

EXAMPLE 1

Positive electrode active material slurry was manufactured by mixing $LiCoO_2$ as a positive electrode active material, carbon black as a conductive material, PVdF as a binder, and $Li_2Co_2$ as an additive at a weight ratio of 97.2:0.9:1.5:0.4 and then adding a N-methyl-2-pyrollidone (NMP). The manufactured slurry was coated on one surface of an aluminum foil, dried, and rolled, and a positive electrode specimen was manufactured by punching a result product to a uniform size by using a specimen tension cutting machine. Here, a rolling degree was 39%.

A displacement-force graph of the positive electrode was obtained by using the brittleness evaluation apparatus 200 of FIG. 10.

During measurement, the size $rg_{max}$ of the inlet of the groove 125 formed at the oval jigs 120 and 120' was 50 mm while the width $rg_{min}$ at the bottom of the groove 125 was 1 mm. Also, the thickness (for example, the thickness 33 of the pressing plate 30 in FIG. 4) of the pressing plate 130 was 1 mm, while the guides 140 and 140' were formed of an aluminum material and spaced apart from the top surfaces of the oval jigs 120 and 120' by a height of 3 mm, and a space for a specimen to move laterally inside the guides 140 and 140', i.e., an inner width of the guides 140 and 140' in a specimen width direction, was 22 mm.

Both end portions of the positive electrode specimen were arranged between the oval jigs 120 and 120' and the guides 140 and 140', and the positive electrode specimen was caused to bend by descending the pressing plate 130 at a speed of 1 mm/sec by using UTM of Instron.

An initial angle of the positive electrode specimen when the pressing plate 130 was descended was 20°. In the present specification, an angle denotes a size of an angle between the specimen contacting the pressing plate 130 and a horizontal plane. The initial angle denotes an angle when a value of force is first measured and recorded after a test is started. The initial angle was defined because, based on the specification of UTM of Instron, the initial angle is not immediately recorded when the test is started but is recorded after 0.1 g or higher.

A change of force applied to the positive electrode specimen was measured and recorded while the pressing plate 130 is continuously descending to obtain a displacement-force graph. FIG. 14 illustrates the graph as a result.

An inflection point on the graph of FIG. 14 occurred when a specimen angle was 60°, and since a shape of the graph of FIG. 14 is similar to the displacement-force graph of brittle/ductile described with reference to FIG. 11, it may be determined that the positive electrode specimen of Example 1 is also brittle/ductile. Also, a brittleness value BV1 that is a difference between values of force before and after plastic deformation may be calculated to be compared with a brittleness value of another electrode specimen.

EXAMPLE 2

An electrode was manufactured in the same manner as Example 1 except that the rolling degree was 32%, and a displacement-force graph was obtained. A result thereof is the graph of FIG. 15.

Regarding brittleness measurement of Example 2 as well, an initial angle of a positive electrode specimen was 20° when the pressing plate 130 was descended, and an inflection point on the graph of FIG. 15 was generated when a specimen angle was 60°. Since the brittleness evaluation apparatus 200 includes the guides 140 and 140', it is determined that the specimen angle was consistently measured at the initial angle and the inflection point in both Example 1 and Example 2.

Also, since a shape of the graph of FIG. 15 is similar to the displacement-force graph of ductile/brittle described in FIG. 11, it may be determined that the positive electrode specimen of Example 2 is also ductile/brittle. Also, a brittleness value BV2 that is a difference between values of force before and after plastic deformation was calculated and compared with the brittleness value BV1 of Example 1 to determine that the brittleness value BV2 of Example 2 was smaller.

Accordingly, compared with the positive electrode specimen of Example 1, the positive electrode specimen of Example 2 had higher ductility based on the displacement-force graph and also higher ductility based on the brittleness value. Since it is determined that brittleness is low when a shape of a displacement-force graph is ductile while having a small brittleness value, it may be determined that a crack riskiness of Example 2 is lower than that of Example 1.

Accordingly, it is determined based on Example 1 and Example 2 that a rolling degree is preferable to be 32% than 39% in terms of electrode brittleness, and the brittleness evaluation method of the present disclosure may be used to verify an effect of adjusting a process variable, such as a rolling degree.

COMPARATIVE EXAMPLE

A displacement-force graph was obtained by eliminating the guides 140 and 140' from the oval jigs 120 and 120' of the brittleness evaluation apparatus 200. A result of obtaining a displacement-force graph by manufacturing a positive electrode in the same manner as Example 2 and measuring a positive electrode specimen a plurality of times is shown in FIG. 16.

As shown in FIG. 16, without the guides 140 and 140', a dispersion was wide and result was inconsistent to be quantified, and it was impossible to measure a change of force. As in Example 1 and Example 2, when there are guides 140 and 140', an inflection point was obtained on a displacement-force graph as an angle gradually increases from an initial angle of 20° and is bent at around 60°. However, when there are no guides 140 and 140' as in Comparative Example, an initial angle started from at least 60° and bending occurred at the beginning of the test or occurred irregularly. Also, a specimen would be distorted or move in one direction, and thus a reproducible result was not obtained when measurement is performed a plurality of times. Accordingly, it was determined that configuration of the guides 140 and 140' largely contribute to accurate measurement by preventing distortion of a specimen.

Although the present disclosure has been described above with reference to specific examples and drawings, it should be understood that the present disclosure is not limited thereto and various changes and modifications will become apparent to one of ordinary skill in the art within the technical ideas of the present disclosure and equivalent scope of claims below.

What is claimed is:
1. A brittleness evaluation apparatus comprising:
  a jig unit comprising:
    two jigs facing each other and having top surfaces formed in a horizontal plane, and configured to receive a specimen arranged on the top surfaces and along a length direction extending between and along the top surfaces;
  a groove between the two jigs, wherein the groove having a width decreasing downward from the top surfaces;
  a pressing plate arranged perpendicular to the length direction and configured to cause the specimen, when present on the top surfaces of the two jigs, to bend by descending into the groove while pressing the specimen; and guides locates on each of the top surfaces of the jigs and configured to preventing distortion of the specimen, when present, during the descent of the pressing plate into the groove, a driving unit configured to cause the pressing plate to descend into the groove; and a measurement analyzing unit configured to measure force applied to the specimen, when present, during the descent of the pressing plate into the groove and to evaluate brittleness.

2. The brittleness evaluation apparatus of claim 1, wherein the top surfaces of the two jigs are configured tor respectively support each end portions of the specimen when present, and wherein a cross section of surfaces of the two jigs facing each other comprises a ¼ oval arc.

3. The brittleness evaluation apparatus of claim 1, further comprising:

horizontal bars provided on each of the two jigs such that the two jigs are movable towards each other or away from each other.

4. The brittleness evaluation apparatus of claim 1, wherein the guides are configured to restrict lateral movement and vertical movement of a portion of the specimen, when present, on the top surfaces of the jigs.

5. The brittleness evaluation apparatus of claim 4, wherein each guide comprises:

an upper wall portion configured to restricting vertical movement of the specimen;

two side wall portions extending between a top surface of a jig and a bottom surface of the upper wall portion, wherein the two side wall portions are configured to restrict lateral movement of the specimen; and a penetrating portion that is a space defined by the two side wall portions, the bottom surface of the upper wall portion, and the top surface of the jig, wherein the penetrating portion is configured to allow movement of the specimen in the length direction, and wherein the guides are located on each of the top surfaces of the jigs such that the penetrating portions of each guide face each other, and the specimen, when present, is disposed on the top surfaces of the two jigs by extending through each of the penetrating portions of the guides.

6. The brittleness evaluation apparatus of claim 1, wherein the guide is manufactured from aluminum or steel use stainless (SUS).

7. The brittleness evaluation apparatus of claim 1, wherein the guides are attached or fixed to the top surfaces of the two jigs in regions excluding where the specimen, when present, is arranged, and wherein each guide includes a portion spaced apart from the top surface of a jig, and an attached or fixed portion in a region excluding where the specimen, when present, is arranged.

8. The brittleness evaluation apparatus of claim 1, wherein a thickness of the pressing plate is the same as a width of a narrowest portion of the groove.

9. The brittleness evaluation apparatus of claim 1, wherein the pressing plate has a rectangular parallelepiped shape having a thickness, a length, and a width, wherein the length is greater than the width is greater than the thickness, and a tip portion having a semi-sphere or semi-polyprism shape, wherein the tip portion formed on a side of the rectangular parallelpiped shaped defined by the thickness and the width, and where the tip portion contacts the specimen, when present, to bend the specimen.

10. The brittleness evaluation apparatus of claim 9, wherein the specimen is an electrode a jelly-roll type electrode assembly, and a radius or size of a cross section of the tip portion has a same dimension as a winding core for manufacturing a jelly-roll type electrode assembly.

11. A brittleness evaluation method comprising:

after arranging a specimen on the brittleness evaluation apparatus of claim 1, descending the pressing plate and measuring force applied to the specimen while the pressing plate descends;

graphing a value of the measured force as a function of specimen displacement; and evaluating a brittleness/ductility level from a shape of the graph of the measured force as a function of the specimen displacement, or obtaining, from the graph, a brittleness value that is a difference of the value of the force before and after plastic deformation of the specimen.

12. The brittleness evaluation method of claim 11, wherein the pressing plate descends vertically at a speed of 0.5 to 2 mm/sec.

13. The brittleness evaluation method of claim 11, wherein the specimen is stored in relative humidity of 0 to 10% and at a room temperature of 25° C. before being measured.

14. The brittleness evaluation method of claim 11, wherein the obtaining of the brittleness value comprises:

obtaining, from the graph, a difference between a highest value of force applied to the specimen and a value of the force applied at an inflection point in the graph after plastic deformation has occurred.

* * * * *